US009699230B2

(12) United States Patent
Alam et al.

(10) Patent No.: US 9,699,230 B2
(45) Date of Patent: Jul. 4, 2017

(54) NETWORK BANDWIDTH CONSERVATION

(71) Applicant: AT&T MOBILITY II LLC, Atlanta, GA (US)

(72) Inventors: Iftekhar Alam, Atlanta, GA (US); Patrick Mascarenhas, Atlanta, GA (US); Ming-Ju Ho, Alpharetta, GA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 204 days.

(21) Appl. No.: 14/565,758

(22) Filed: Dec. 10, 2014

(65) Prior Publication Data
US 2016/0173388 A1   Jun. 16, 2016

(51) Int. Cl.
G06F 15/173      (2006.01)
H04L 29/06       (2006.01)

(52) U.S. Cl.
CPC ...... H04L 65/4084 (2013.01); H04L 65/4076 (2013.01)

(58) Field of Classification Search
CPC .................. H04L 65/4084; H04L 65/4076
USPC ........ 709/228, 230, 241, 203, 219, 227, 232
See application file for complete search history.

(56) References Cited

U.S. PATENT DOCUMENTS

| 6,834,195 | B2 | 12/2004 | Brandenberg et al. |
| 7,613,768 | B2 | 11/2009 | Harville et al. |
| 7,770,200 | B2 | 8/2010 | Brooks et al. |
| 7,831,989 | B1 | 11/2010 | Calzone et al. |
| 7,873,638 | B2 | 1/2011 | Young et al. |
| 7,945,545 | B1 | 5/2011 | Sorkin et al. |
| 8,036,690 | B1 * | 10/2011 | Delker ............... H04W 4/18 455/115.3 |
| 8,365,306 | B2 | 1/2013 | Maes |
| 8,438,243 | B2 * | 5/2013 | LaJoie ............... G06Q 30/0256 709/203 |
| 8,561,116 | B2 | 10/2013 | Hasek |

(Continued)

FOREIGN PATENT DOCUMENTS

| AU | 2006240157 A1 | 11/2006 |
| CA | 2849158 A1 | 3/2013 |

OTHER PUBLICATIONS

"Content for All—The Potential for LTE Broadcast/eMBMS", iGR, White Paper, Jan. 2013, pp. 1-20.

(Continued)

Primary Examiner — Michael Y Won
(74) Attorney, Agent, or Firm — Toler Law Group, PC

(57) ABSTRACT

A method includes determining, at a server associated with a wireless communications network, a first set of multimedia content items to be transmitted via a multimedia broadcast multicast services (MBMS) broadcast transmission to multiple devices. The first set of multimedia content items may be determined based on a data traffic profile of the wireless communication network. The server may select a particular node of the wireless communications network to transmit the first set of multimedia content items via the MBMS broadcast transmission. The method also includes determining a second set of multimedia content items to be transmitted from the selected node to a particular device via a unicast transmission. The second set of multimedia content items may be determined based on a content request profile associated with the particular device.

20 Claims, 9 Drawing Sheets

(56) References Cited

U.S. PATENT DOCUMENTS

| | | | |
|---|---|---|---|
| 8,582,584 B2 | 11/2013 | Rieger et al. | |
| 8,862,155 B2 | 10/2014 | Stern et al. | |
| 2002/0049841 A1 | 4/2002 | Johnson et al. | |
| 2002/0152305 A1 | 10/2002 | Jackson et al. | |
| 2005/0154996 A1* | 7/2005 | Othmer | H04M 1/72522 715/774 |
| 2008/0242290 A1* | 10/2008 | Bhatia | H04L 12/5895 455/422.1 |
| 2008/0273591 A1 | 11/2008 | Brooks et al. | |
| 2008/0301750 A1 | 12/2008 | Silfvast et al. | |
| 2010/0050032 A1* | 2/2010 | Bichot | H04L 1/1867 714/746 |
| 2011/0305183 A1* | 12/2011 | Hsu | H04W 72/005 370/312 |
| 2013/0046849 A1 | 2/2013 | Wolf et al. | |
| 2013/0111520 A1* | 5/2013 | Lo | H04L 67/306 725/35 |
| 2013/0254815 A1 | 9/2013 | Pfeffer et al. | |
| 2014/0280878 A1 | 9/2014 | Hardin et al. | |
| 2015/0081838 A1* | 3/2015 | Stockhammer | H04L 67/10 709/217 |
| 2016/0173388 A1* | 6/2016 | Alam | H04L 65/4084 709/219 |
| 2016/0242174 A1* | 8/2016 | Bontu | H04W 72/005 |

OTHER PUBLICATIONS

14 LTE Broadcast Business Cases, Expway, White Paper, Jun. 24, 2014, pp. 1-17.

Atreyam, S. et al., "LTE Broadcast", IDC Analyze the Future, White Paper, Sep. 2014, pp. 1-15.

Palau, C. et al., "Wireless CDN Video Streaming Architecture for IPTV", Multimedia Tools and Applications, Apr. 1, 2010, Springer Science+Business Media, LLC, pp. 591-613.

Al-Arnaout, Z., "Content Replication and Placement Schemes for Wireless Mesh Networks", A thesis submitted to the Victoria University of Wellington in fulfillment of the requirements for the degree of Doctor of Philosophy in Computer Science, Victoria University of Wellington, 2014, 215 pages.

Dounis, C. et al., "Cross layer design for wireless video transmission—panorama of approaches", International Scientific Conference eRA-8, Sep. 28, 2013, 149 pages.

Montpetit, M., "IPTV: An End to End Perspective", Journal of Communications, vol. 5, No. 5, May 2010, pp. 358-373.

Palau, C. et al., "Wireless CDN video streaming architecture for IPTV", Multimedia Tools and Applications, Published online Apr. 1, 2010, Springer Science+Business Media, LLC, pp. 591-613.

Qiu, C., "A new Content Distribution Network architecture—PlentyCast", Master of Science Thesis, Royal Institute of Technology, Apr. 30, 2014, Stockholm, Sweden, 112 pages.

* cited by examiner

NETWORK BANDWIDTH CONSERVATION

FIELD OF THE DISCLOSURE

The present disclosure is generally related to wireless communications.

BACKGROUND

The ability to deliver data at a high throughput and at a low latency via a mobility network is limited by the air interface. During peak data usage hours, a large number of users may overwhelm the mobility network, resulting in low data throughput. Radio interference of the air interface due to sharing may further reduce throughput and may adversely affect a user experience. In order to increase capacity of a mobility network, a network provider may allocate additional spectrum, build new sites, build smaller cells, or split cell sectors. Such approaches may be cost prohibitive (or may increase costs), may add complexity, and may have long lead times.

Traffic models indicate that downlink traffic volume of a network is generally higher than uplink traffic volume of the network. The downlink traffic volume may spike during peak data usage hours (e.g., between 12 pm and 6 pm). Traffic handling nodes of the network may be designed to accomodate a peak traffic load that occurs during the peak data usage hours. During off-peak hours, the downlink traffic volume may be significantly less than the peak traffic load, resulting in underutilization of network resources (e.g., for up to 18 hours each day).

DETAILED DESCRIPTION

Figure 1:
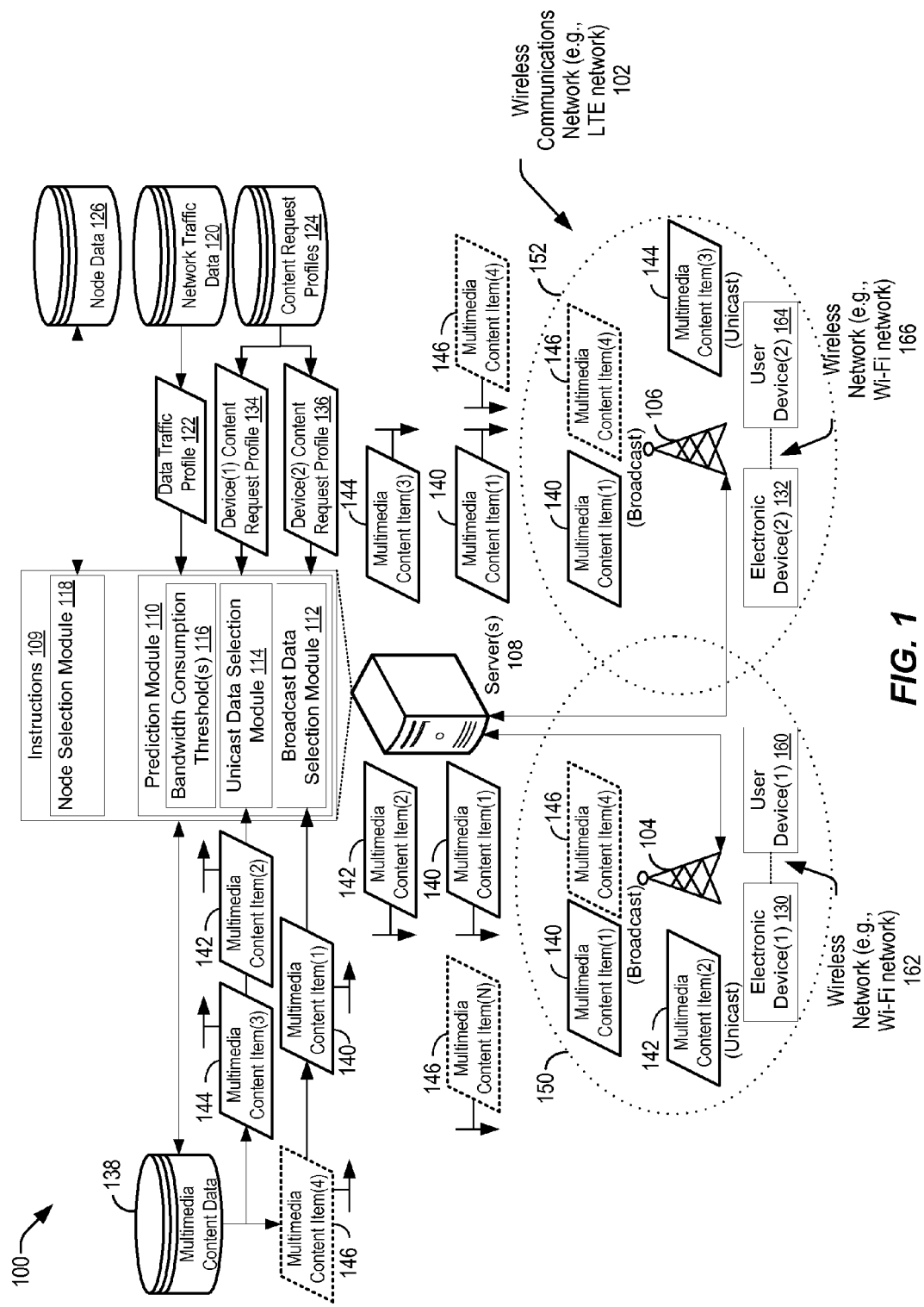
FIG. 1 is a diagram illustrating a particular embodiment of a system for conserving network bandwidth during a first time period (e.g., a peak usage period) by pre-delivering particular content item(s) to a device during a second time period (e.g., an off-peak usage period) for storage at the device.

The present disclosure describes systems and methods of conserving network bandwidth by pre-delivering content item(s) during a particular time period (e.g., an off-peak usage period) that are predicted to have a high likelihood of being requested during another time period (e.g., a peak usage period). A server of a wireless communications network (e.g., a long term evolution (LTE) network) may analyze network usage data to predict content item(s) likely to be consumed during peak hours and may pre-deliver the content item(s) via the wireless communications network during off-peak hours. Particular content item(s) may be identified for pre-delivery via broadcast transmission(s), while other content item(s) may be identified for pre-delivery via unicast transmission(s) to a particular device. Subsequently (e.g., during peak hours), a pre-delivered content item that is stored in memory of a device may be retrieved from the memory in response to a user request. In some cases, the pre-delivered content item may be retrieved from memory for delivery to a user device (e.g., a smartphone or a tablet computing device) via a network (e.g., a Wi-Fi network) that is distinct from the wireless communications network (e.g., the LTE network), potentially conserving resources of the wireless communications network during peak hours.

As an example, consumer usage data may be used to predict content items (e.g., multimedia content items) that are expected to be the most popular content items during a peak usage period. To illustrate, a particular multimedia content item (e.g., a particular episode of a television series available via a streaming media site) may be predicted to be the most commonly requested media item (that consumes a significant portion of available network bandwidth). As another example, the consumer usage data may be used to predict a particular website with a highest likelihood of being requested during the peak usage period. In some cases, the particular website may include multimedia advertisement(s) that are predicted to consume a significant portion of available network bandwidth. The content item(s) that are predicted to consume more network bandwidth during the peak usage period as a result of requests from multiple devices may be identified as content item(s) for pre-delivery via broadcast transmission(s) or unicast transmission(s). For example, in some cases, content item(s) that are predicted to have a high likelihood of being requested by multiple users during a peak usage period (e.g., a top ten list of requested items for all users) may be transmitted via one or more multimedia broadcast multicast services (MBMS) broadcast transmissions (e.g., eMBMS broadcast transmissions in the case of an LTE network). As another example, content item(s) that are predicted to have a high likelihood of being requested by a particular device during a peak usage period (e.g., a top ten list of requested items for the particular device) may be transmitted via one or more unicast transmissions to the particular device. Thus, bandwidth-intensive content items that are predicted (on an aggregate basis) to have a high likelihood of being requested during the peak usage period may be efficiently pre-delivered to multiple devices via an MBMS broadcast transmission. Bandwidth-intensive content items that are predicted (on an individual device basis) to have a high likelihood of being requested during the peak usage period may be delivered to an individual device via a unicast transmission.

As another example, the consumer usage data may indicate that a particular user has previously accessed a content item (e.g., a news site, a weather site, a television series, etc.) at a particular time of day (e.g., during peak hours) at a particular location (e.g., at home, at a coffee shop, etc.). In this case, the server may predict whether the particular user is likely to request the content item at the particular location during peak hours based on a comparison of the time of day that the content item was previously accessed from the particular location. As another example, the consumer usage data may indicate that the user has previously accessed a content item having particular characteristics (e.g., a genre, an actor, a director, a theme, etc.). In this case, the server may predict whether the user is likely to request a particular content item during peak hours based on a comparison of characteristics of the particular content item to the characteristics of the previously accessed content item. The content item(s) that are predicted to consume more network bandwidth during the peak usage period as a result of requests from a particular device may be identified as content item(s) for pre-delivery via unicast transmission(s) to the particular device (rather than pre-delivery via an MBMS broadcast transmission).

In some cases, particular content may be accessible to the server during off-peak hours (e.g., after midnight). The server may use available network resources to push (e.g., pre-deliver) the particular content to a location closer to a particular user device (e.g., a mobile phone, a home television, etc.) during the off-peak hours (e.g., via broadcast and/or unicast transmission). For example, the server may pre-deliver the particular content via a wireless communications network to a content delivery device (e.g., a home terminal, a set-top box device, an access point, a station, a node B device, etc.) that is on a delivery path to the particular user device. Alternatively, the server may pre-deliver the particular content to multiple content delivery nodes along the delivery path and one or more of the content delivery nodes may cache (e.g., store) the particular content.

Pre-delivery of content may allow a user to access the content via another network (e.g., a local area network, a wireless network, etc.) during peak hours, potentially resulting in a reduced network load of the delivery network during peak hours. Network resources that are available as a result of the reduced network load may be used to service other data requests, potentially resulting in increased data throughput and lower latency associated with the other data requests. Further, the user may experience lower latency by retrieving the pre-delivered content from the content delivery device rather than retrieving the content from another device that is farther (e.g., a larger number of hops) from the user device. In some cases, the server may bill a user for data that is retrieved from the content delivery device and may refrain from billing the user for data that is delivered to the content delivery device but not retrieved by an end user device.

In some cases, the server may compare a location of a particular device to locations of various delivery nodes (e.g., transmission towers) in order to select a particular content delivery node that is located proximate to the location of the particular device. The server may pre-deliver data to the selected content delivery node for broadcast transmission or unicast transmission. To illustrate, the consumer usage data may indicate that a user device accesses a particular site that includes bandwidth intensive multimedia content during lunch (i.e., during peak hours) from a particular coffee shop. The server may pre-deliver data (e.g., one or more multimedia content items) associated with the particular site at a second time (e.g., 10:30 AM) to an access point of a Wi-Fi network of the coffee shop. During lunch at the coffee shop, the user (via the user device) may send a request via the Wi-Fi network for the particular site. The cached data may be retrieved from the access point in response to the request and may be provided to the user device. In a particular embodiment, the server may pre-deliver "delta/incremental" data to the selected content delivery node (e.g., the access point at the coffee shop in this illustrative example). For example, a portion of a content item may remain unchanged over a particular time period (e.g., from day to day). In this case, the content manager device may pre-deliver data corresponding to the portion of the content item that has changed.

In a particular embodiment, a method includes determining, at a server associated with a wireless communications network, a first set of multimedia content items (including one or more items) to be transmitted to multiple devices including a first device and a second device via a multimedia broadcast multicast services (MBMS) broadcast transmission. The first set of multimedia content items may be determined based on a data traffic profile of the wireless communication network. The server may select a particular node (e.g., a transmission tower) of the wireless communications network to transmit the first set of multimedia content items via the MBMS broadcast transmission. The method also includes determining a second set of multimedia content items (including one or more items) to be transmitted from the selected node to the first device via a unicast transmission. The second set of multimedia content items may be determined based on a content request profile associated with the first device.

In another particular embodiment, a computer-readable storage device stores instructions that are executable by a processor of an electronic device to perform operations. The operations include determining, based on a data traffic profile of a wireless communications network, a first set of multimedia content items (including one or more items) that is predicted to consume more network bandwidth than other multimedia content items during a first time period associated with a higher network bandwidth consumption rate than a network bandwidth consumption rate associated with a second time period. The operations include selecting a particular node (e.g., a transmission tower) of a plurality of nodes of the wireless communications network to transmit the first set of multimedia content items during the second time period via a first MBMS broadcast transmission to a plurality of devices. The operations also include determining, based on a content request profile associated with a particular device of the plurality of devices, a second set of multimedia content items (including one or more items) to be transmitted from the selected node to the particular device during the second time period via a first unicast transmission.

In another particular embodiment, an electronic device includes a processor and a memory coupled to the processor. The memory stores instructions that are executable by the processor to perform various operations. The operations may include receiving a first set of multimedia content items via at least one MBMS broadcast transmission from a wireless communications network and storing the first set of multimedia content items in the memory. The operations also include receiving a second set of multimedia content items via at least one unicast transmission and storing the second set of multimedia content items in the memory. The operations further include receiving, from a device, a request for a particular multimedia content item (e.g., via a second wireless network that is different from the wireless communications network). Responsive to the request, the operations include determining whether the particular multimedia content item is included in the first set of multimedia content items stored in the memory or is included in the second set of multimedia content items stored in the memory. In response to determining that the particular multimedia content item is stored in the memory, the operations include sending the particular multimedia content item to the device (e.g., via the second wireless network).

Referring to FIG. 1, a particular embodiment of a network bandwidth conservation system is illustrated and generally designated 100. FIG. 1 illustrates a particular example of a wireless communications network 102 (e.g., an LTE network) that includes a plurality of nodes, including a first transmission tower 104 and a second transmission tower 106. In other embodiments, an alternative number and/or arrangement of nodes may be associated with the wireless communications network 102. In FIG. 1, the first transmission tower 104 and/or the second transmission tower 106 may be used to pre-deliver a first set of multimedia content items (including one or more items) via broadcast transmission(s) and to pre-deliver a second set of multimedia content items (including one or more items) via unicast transmission(s).

FIG. 1 illustrates that a server 108 (or multiple servers) may be associated with the wireless communications network 102. In the particular embodiment illustrated in FIG. 1, the server 108 includes a memory that stores instructions 109, including a prediction module 110 configured to identify one or more content items (e.g., one or more multimedia content items) that are predicted to have a high likelihood of being requested during a particular time period (e.g., a peak usage period of the wireless communications network 102). The prediction module 110 may include a broadcast data selection module 112, a unicast data selection module 114, and a bandwidth consumption threshold 116 (or multiple bandwidth consumption thresholds). The server 108 also includes a node selection module 118 (e.g., a transmission tower selection module).

FIG. 1 illustrates that data stored in one or more databases may be accessible to the server 108. In the example of FIG. 1, network traffic data 120 may be accessible to the server 108, and a data traffic profile 122 associated with the wireless communications network 102 may be determined based on the network traffic data 120. For example, the data traffic profile 122 may include data associated with a plurality of content items (e.g., multimedia content items) that were previously transmitted to multiple devices via the wireless communications network 102. The data traffic profile 122 may determine a rank of content items that are predicted to be bandwidth-intensive content items that are likely to consume more network bandwidth than other content items during a peak usage period. The data traffic profile 122 may also identify a peak usage period associated with individual transmission towers (e.g., the first transmission tower 104 and the second transmission tower 106).

FIG. 1 further illustrates that content request profiles 124 associated with particular devices may be accessible to the server 108. Further, node data 126 (e.g., a transmission range and/or a transmission power associated with individual transmission towers of the wireless communications network 102) may be accessible to the server 108. As described further herein with respect to FIG. 3, particular transmission tower(s) may have more than one transmission power (e.g., a higher transmission power associated with a higher transmission range and a lower transmission power associated with a lower transmission range).

In the particular embodiment illustrated in FIG. 1, a first device 130 (e.g., a first media device, such as a set-top box device, an access point, or other "wireless local loop" terminal) and a second device 132 (e.g., a second media device) are shown. A first content request profile 134 may be associated with the first device 130, and a second content request profile 136 may be associated with the second device 132. In alternative embodiments, the content request profiles 124 may include an alternative number of content request profiles associated with an alternative number of devices. In some cases (e.g., in the case of an access point for a wireless network at a coffee shop in the example described above), multiple electronic devices (e.g., smartphones and/or tablet computing devices) may request multimedia content items via the first device 130 and/or second device 132. In a particular embodiment, the first device 130 may send the first content request profile 134 to the server 108 (e.g., during an off-peak usage period that follows a peak usage period), and the first content request profile 134 may identify particular multimedia content item(s) that have been requested by the individual electronic devices (e.g., during the peak usage period). In a particular embodiment, the second device 130 may send the second content request profile 136 to the server 108 (e.g., during an off-peak usage period that follows a peak usage period), and the second content request profile 136 may identify particular multimedia content item(s) that have been requested by the individual electronic devices (e.g., during the peak usage period).

FIG. 1 illustrates that multimedia content data 138 may be accessible to the prediction module 110 of the server 108. The broadcast data selection module 112 is configured to identify one or more multimedia content items for broadcast transmission (e.g., an MBMS broadcast transmission) via one or more transmission towers of the wireless communications network 102. In the example illustrated in FIG. 1, the broadcast data selection module 112 may identify a first multimedia content item 140 for broadcast transmission via one or more transmission towers of the wireless communications network 102. For example, the first multimedia content item 140 may include a video-on-demand content item or an advertising content item, among other alternatives.

The first multimedia content item 140 satisfies a particular bandwidth consumption threshold 116 (e.g., associated with a bandwidth-intensive application). The first multimedia content item 140 is predicted to consume more network bandwidth than other multimedia content items of the plurality of multimedia content items during a time period associated with a higher network bandwidth consumption rate (e.g., a peak usage period of the wireless communications network 102) than a network bandwidth consumption rate associated with another time period (e.g., an off-peak usage period of the wireless communications network 102). As an illustrative, non-limiting example, the first multimedia content item 140 may represent a multimedia content item, such as a particular episode of a television series (e.g., a first run episode) or a particular multimedia advertisement (e.g., at a popular site), that is predicted to consume more network bandwidth than other content items during the peak usage period as a result of multiple requests to the wireless communications network 102 from multiple devices. For example, the first multimedia content item 140 may correspond to a highest ranked content item on a "top ten list" of most popular television series episodes based on a prior day's measured traffic usage during the peak usage period. FIG. 1 further illustrates a particular embodiment in which more than one multimedia content item (e.g., an Nth multimedia content item 146) may be identified for broadcast transmission. As an illustrative, non-limiting example, the Nth multimedia content item 146 may represent a multimedia content item, such as a particular episode of a television series or a particular multimedia advertisement at a popular site that is predicted to have a next highest rank (after the first multimedia content item 140) with respect to consumption of network bandwidth resources during the peak usage period. To illustrate, the Nth multimedia content item 146 may represent a second ranked content item in the example of the "top ten list" described above. Thus, the first multimedia content item 140 and the Nth multimedia content item 146 represent bandwidth-intensive content items that are predicted (on an aggregate basis) to have a high likelihood of being requested by multiple devices during the peak usage period. Accordingly, an MBMS transmission may be used to efficiently pre-deliver particular content item(s) to multiple devices via a single broadcast transmission (rather than a more-bandwidth intensive process of pre-delivering the particular content item to individual devices via separate unicast transmissions).

The unicast data selection module 114 is configured to identify one or more multimedia content items for unicast transmission via one or more transmission towers of the wireless communications network 102. In the example illustrated in FIG. 1, the unicast data selection module 114 may identify a second multimedia content item 142 for unicast transmission to the first device 130 (e.g., via the first transmission tower 104). For example, the second multimedia content item 142 may include a video-on-demand content item or an advertising content item, among other alternatives. Further, the unicast data selection module 114 may identify a third multimedia content item 144 for unicast transmission to the second device 132 (e.g., via the second transmission tower 106). As an illustrative, non-limiting example, the second multimedia content item 144 may represent a multimedia content item, such as a particular episode of a television series (e.g., a next episode after a most recently watched episode based on the content request profile 134) or a particular multimedia advertisement (e.g., at a popular site), that is predicted to consume more network bandwidth than other content items during the peak usage period as a result of request(s) to the wireless communications network 102 from the first device 130.

FIG. 1 illustrates that a transmission range 150 may be associated with the first transmission tower 104. In the example of FIG. 1, the first device 130 is located within the transmission range 150 of the first transmission tower 104 and may receive the first multimedia content item 140 via the broadcast transmission. Alternatively (as described further herein with respect to FIG. 3), more than one device may be located within the transmission range 150 of the first transmission tower 104. Thus, the first multimedia content item 140 may be communicated for storage at multiple devices within the transmission range 150 of the first transmission tower 104 via a single broadcast transmission.

FIG. 1 further illustrates that a transmission range 152 may be associated with the second transmission tower 106. In the example of FIG. 1, the second device 132 is located within the transmission range 152 of the second transmission tower 106 and may receive the first multimedia content item 140 via the broadcast transmission from the second transmission tower 106. Alternatively (as described further herein with respect to FIG. 3), more than one device may be located within the transmission range 152 of the second transmission tower 106. Thus, the first multimedia content item 140 may be communicated for storage at multiple devices within the transmission range 152 of the second transmission tower 106 via a single broadcast transmission.

In the particular embodiment illustrated in FIG. 1, the first device 130 (e.g., a first set-top box device, access point, or other "wireless local loop" terminal) may communicate with a first user device 160 (e.g., a smartphone or a tablet computing device) via a wireless network 162 (e.g., a first Wi-Fi network) that may be different from the wireless communications network 102 (e.g., the LTE network). FIG. 1 further illustrates that the second device 132 (e.g., a second set-top box device, access point, or other "wireless local loop" terminal) may communicate with a second user device 160 (e.g., a smartphone or a tablet computing device) via a wireless network 166 (e.g., a second Wi-Fi network) that is different from the wireless communications network 102 (e.g., the LTE network).

In operation, the server 108 may receive the data traffic profile 122, and the prediction module 110 may analyze the data traffic profile 122. The data traffic profile 122 identifies a plurality of multimedia content items that have been transmitted to multiple devices via the wireless communications network 102 (e.g., during a previous peak usage period). The broadcast data selection module 112 may determine one or more multimedia content items that satisfy a particular bandwidth consumption threshold 116 for transmission via an MBMS broadcast transmission. In the example of FIG. 1, the broadcast data selection module 112 may determine that the first multimedia content item 140 and the Nth multimedia content item 146 satisfy the particular bandwidth consumption threshold 116 for broadcast transmission. For example, based on the data traffic profile 122, the first multimedia content item 140 and the Nth multimedia content item 146 may represent multimedia content items that are predicted to consume more network bandwidth than other multimedia content items during the peak usage period (e.g., the top two most requested content items on the "top ten list" of requested items from a previous peak usage period).

The node selection module 118 of the server 108 may select a particular node (e.g., transmission tower) to transmit the multimedia content item(s) identified by the broadcast data selection module 112 for transmission via one or more MBMS broadcast transmissions (e.g., the first multimedia content item 140 and the Nth multimedia content item 146 in the example of FIG. 1). FIG. 1 illustrates that the node selection module 118 may select the first transmission tower 104 to transmit the first multimedia content item 140 via a first MBMS broadcast transmission (to one or more devices within the transmission range 150 of the first transmission tower 104). The server 108 may send the first multimedia content item 140 to the first transmission tower 104 (e.g., via a wired connection, a wireless connection, or a combination thereof).

In the particular embodiment illustrated in FIG. 1, the node selection module 118 may also select the second transmission tower 106 to transmit the first multimedia content item 140 via another MBMS broadcast transmission (to one or more devices within the transmission range 152 of the second transmission tower 106). The server 108 may send the first multimedia content item 140 to the second transmission tower 106 (e.g., via a wired connection, a wireless connection, or a combination thereof). In some cases, the broadcast data selection module 112 may determine that multiple multimedia content items satisfy the particular network bandwidth consumption threshold 116. FIG. 1 illustrates one example in which the broadcast data selection module 112 determines that the Nth multimedia content item 146 also satisfies the bandwidth consumption threshold 116 for pre-delivery of content via broadcast transmission.

FIG. 1 illustrates that the node selection module 118 may select the first transmission tower 104 to transmit the Nth multimedia content item 146 via a second MBMS broadcast transmission (to one or more devices within the transmission range 150 of the first transmission tower 104). The server 108 may send the Nth multimedia content item 146 to the first transmission tower 104 (e.g., via a wired connection, a wireless connection, or a combination thereof). As an example, FIG. 1 illustrates that the node selection module 118 may also select the second transmission tower 106 to transmit the Nth multimedia content item 146 via a second MBMS broadcast transmission (to one or more devices within the transmission range 152 of the second transmission tower 106). The server 108 may send the Nth multimedia content item 146 to the second transmission tower 106 (e.g., via a wired connection, a wireless connection, or a combination thereof). As described further herein with respect to FIG. 3, in some cases, particular nodes (e.g., transmission towers) may be selected for broadcast transmission(s). For example, a transmission tower with a data traffic profile that includes a peak usage period that is different from other transmission towers may not be used for broadcast transmission(s). To illustrate, a transmission tower with a transmission range that covers a busy night-club area may have an increased data traffic volume during "off-peak" hours (e.g., after midnight) as a result of increased pedestrian traffic in such entertainment districts.

The unicast data selection module 114 may determine one or more multimedia content items that satisfy a particular bandwidth consumption threshold 116 for transmission via unicast transmission(s) to individual device(s). Content item(s) that are selected for individual unicast transmission(s) represent bandwidth-intensive content item(s) that are predicted to have a high likelihood of being requested by a particular device during a peak usage period (e.g., one or more content items on a "top ten list" of requested items for the particular device). To illustrate, some users may be more likely to request episodes of a television series (e.g., a television series related to competitive eating or a television series related to knitting) that are not included on the "top ten list" of most requested items on an aggregate basis. In the example of FIG. 1, the unicast data selection module 114 may determine that the second multimedia content item 142 satisfies the particular bandwidth consumption threshold 116 for unicast transmission. For example, based on the content request profile 134 associated with the first device 130, the second multimedia content item 142 may represent a multimedia content item that is predicted to consume more network bandwidth than other multimedia content items during a first time period associated with a higher network bandwidth consumption rate (e.g., a peak usage period) than a network bandwidth consumption rate associated with a second time period (e.g., an off-peak usage period). FIG. 1 illustrates an example in which the unicast data selection module 114 identifies one multimedia content item (e.g., the second multimedia content item 142) that satisfies the particular bandwidth consumption threshold 116 for unicast transmission. In other cases, the unicast data selection module 114 may determine that multiple multimedia content items satisfy the particular network bandwidth consumption threshold 116 for unicast transmission (to the first device 130).

FIG. 1 further illustrates that the unicast data selection module 114 may determine that the third multimedia content item 144 satisfies the particular bandwidth consumption threshold 116 for unicast transmission. For example, based on the content request profile 136 associated with the second device 132, the third multimedia content item 144 may represent a multimedia content item that is predicted to consume more network bandwidth than other multimedia content items that are predicted as likely to be requested by the second device 132 during the first time period (e.g., a peak usage period). FIG. 1 illustrates an example in which the unicast data selection module 114 identifies one multimedia content item (e.g., the third multimedia content item 144) that satisfies the particular bandwidth consumption threshold 116 for unicast transmission. In other cases, the unicast data selection module 114 may determine that multiple multimedia content items satisfy the particular network bandwidth consumption threshold 116 for unicast transmission (to the second device 132).

The server 108 may send the second multimedia content item 142 to the first transmission tower 104, and the first transmission tower 104 may transmit the second multimedia content item 142 to the first device 130 via a unicast transmission (e.g., during an off-peak usage period). In a particular embodiment, multimedia content item(s) that are identified for broadcast transmission by the broadcast data selection module 112 may represent higher priority content items than multimedia content item(s) that are identified for unicast transmission by the unicast data selection module 114. In a particular embodiment, the server 108 may delay sending the second multimedia content item 142 to the first transmission tower 104 until the server 108 receives a message from the first transmission tower 104 that indicates that particular multimedia content item(s) identified for broadcast transmission by the broadcast data selection module 112 (e.g., the first multimedia content item 140 and the Nth multimedia content item 146) have been transmitted by the first transmission tower 104. In response to receiving the message from the first transmission tower 104, the server 108 may send the second multimedia content item 142 to the first transmission tower 104. Alternatively, as described further herein with respect to FIG. 4, the server 108 may send the second multimedia content item 142 to the first transmission tower 104 during a time period that is designated for unicast transmissions (that follows a time period that is designated for broadcast transmissions).

The server 108 may send the third multimedia content item 144 to the second transmission tower 106, and the second transmission tower 106 may transmit the third multimedia content item 144 to the second device 132 via a unicast transmission (e.g., during an off-peak usage period).

In a particular embodiment, the server 108 may wait to receive a message from the second transmission tower 106 before sending the third multimedia content item 144 to the second transmission tower 106. For example, the message may indicate that particular multimedia content item(s) identified for broadcast transmission by the broadcast data selection module 112 (e.g., the first multimedia content item 140 and the Nth multimedia content item 146) have been transmitted by the second transmission tower 106. In response to receiving the message from the second transmission tower 106, the server 108 may send the third multimedia content item 144 to the second transmission tower 106. Alternatively, as described further herein with respect to FIG. 4, the server 108 may send the third multimedia content item 144 to the second transmission tower 106 during a time period that is designated for unicast transmissions (that follows a time period that is designated for broadcast transmissions).

Figure 2:
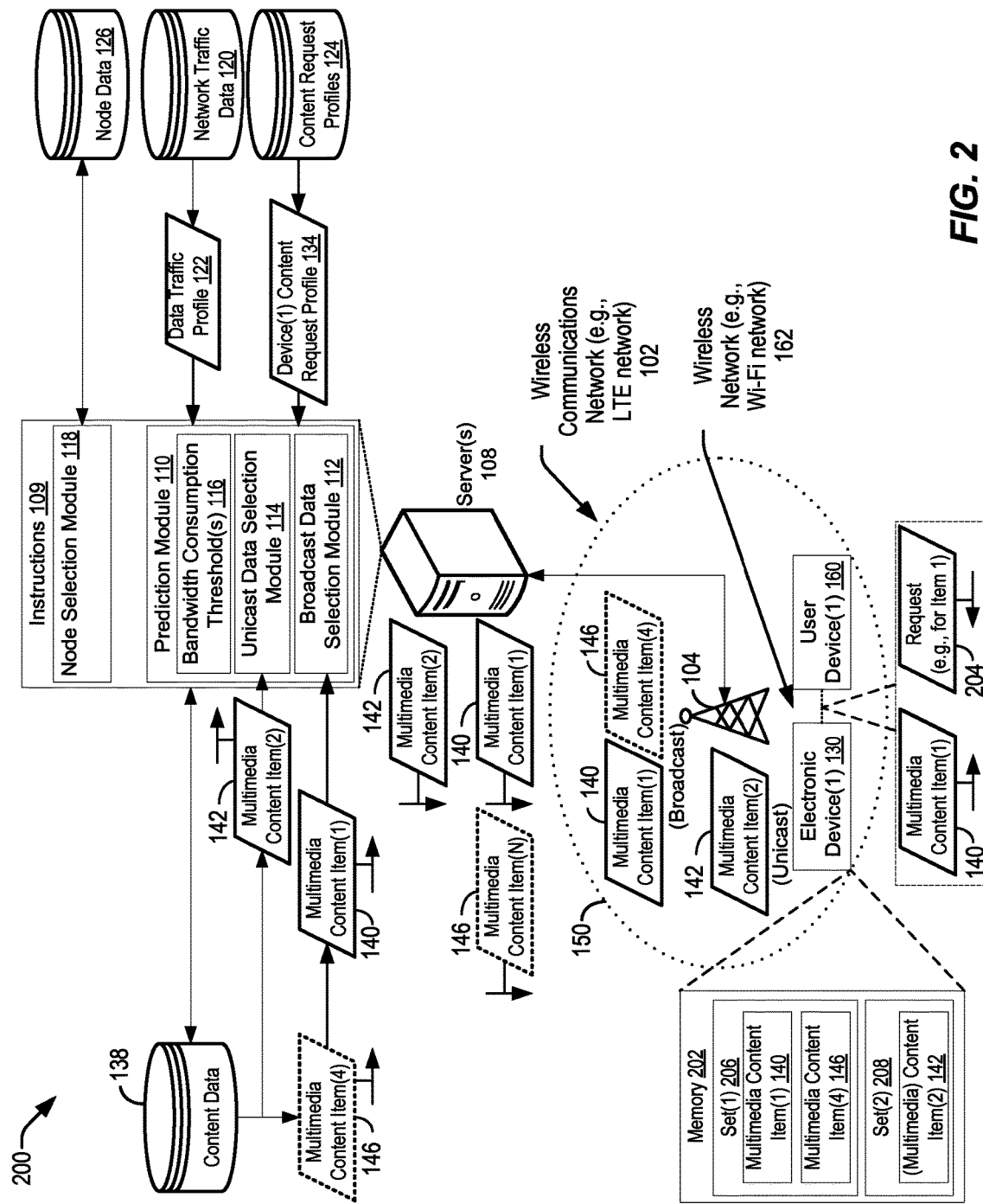
FIG. 2 is a diagram illustrating a particular embodiment of a system for retrieval (e.g., during a peak usage period) of content item(s) that are pre-delivered to a device (e.g., during an off-peak usage period) and that are stored in a memory of the device.

As described further herein with respect to FIG. 2, the multimedia content item(s) that are pre-delivered to device(s) of the wireless communications network 102 may be retrieved from a memory of a particular device in response to receiving a request for a particular multimedia content item. Rather than utilize network bandwidth of the wireless communications network 102 to retrieve the particular multimedia content item (e.g., during a peak usage period), the pre-delivered content may be provided to a user device via another wireless network (e.g., a Wi-Fi network). To illustrate, in the example of FIG. 1, the first user device 160 (e.g., a smartphone or a tablet computing device) may retrieve the first multimedia content item 140, the second multimedia content item 142, or the Nth multimedia content item 146 from the first device 130 (e.g., a set-top box device, an access point, or another "wireless local loop" terminal) via the wireless network 162 (rather than sending a request to receive the particular item via the wireless communications network 102). As another example, a second user device 164 may retrieve the first multimedia content item 140, the third multimedia content item 144, or the Nth multimedia content item 146 from the second device 132 via the wireless network 166 (rather than sending a request to receive the particular item via the wireless communications network 102).

Referring to FIG. 2, a particular embodiment of a network bandwidth conservation system is illustrated and generally designated 200. FIG. 2 illustrates a particular example in which multimedia content item(s) that are pre-delivered to a particular device (e.g., during an off-peak usage period) may be retrieved from a memory of the particular device (e.g., during a peak usage period). Pre-delivery of particular multimedia content item(s) that are predicted to have a high likelihood of being requested during a peak usage period may conserve network bandwidth of the wireless communications network 102 during the peak usage period.

FIG. 2 illustrates that the first device 130 (e.g., a media device, such as a set-top box device or other "wireless local loop" terminal) may include a memory 202 to store multimedia content item(s) that are pre-delivered to the first device 130 via the first transmission tower 104 (e.g., during an off-peak usage period of the wireless communications network 102). In some cases, an electronic device (e.g., the first user device 160) may be configured to determine whether a particular content item is available via the wireless network 162 before sending a request for the particular content item to the wireless communications network 102. In response to a request 204 from an electronic device (e.g., the first user device 160) for a particular media content item, the first device 130 is configured to determine whether the particular item is stored in the memory 202. When the requested content item was pre-delivered to the first device 130 and stored in the memory 202, the first device 130 may send the content item to the first user device 160 via the wireless network 162 without the first user device 160 sending a request for the content item to the wireless communications network 102.

The first device 130 is configured to receive a first set 206 of multimedia content item(s) via at least one MBMS broadcast transmission from the first transmission tower 104. For example, the first multimedia content item 140 may be received via a first MBMS broadcast transmission from the first transmission tower 104, and the Nth multimedia content item 146 may be received via a second MBMS broadcast transmission from the first transmission tower 104. Alternatively, multiple content items may be transmitted via a single MBMS broadcast transmission. For example, the first multimedia content item 140 and the second multimedia content item 146 may be provided to the first device 130 via a single MBMS broadcast transmission. The first device 130 is further configured to store the first set 206 of multimedia content items in the memory 202. In a particular embodiment, the first device 130 may receive a message (not shown in FIG. 2) that identifies another time period associated with the at least one MBMS broadcast transmission. The first device 130 may be configured to activate a wireless interface (not shown in FIG. 2) to communicate with the wireless communications network 102 during at least a portion of the other time period to receive the first set 206 of multimedia items from the first transmission tower 104.

The first device 130 is further configured to receive a second set 208 of multimedia content item(s) via at least one unicast transmission from the first transmission tower 104. For example, the second multimedia content item 142 may be received via a unicast transmission from the first transmission tower 104. The first device 130 is further configured to store the second set 208 of multimedia content items in the memory 202. In a particular embodiment, the first device 130 may receive a message (not shown in FIG. 2) that identifies another time period associated with the at least one unicast transmission. The first device 130 may be configured to activate a wireless interface (not shown in FIG. 2) to communicate with the wireless communications network 102 during at least a portion of the other time period to receive the second set 208 of items from the first transmission tower 104.

In operation, the first device 130 may receive the request 204 for a particular content item (e.g., the first multimedia content item 140 in the example of FIG. 2) from the first user device 160. Responsive to the request 204, the first device 130 may access the memory 202 to determine whether the particular requested content item is included in the first set 206 of content items or is included in the second set 208 of content items stored in the memory 202. In response to determining that the particular multimedia content item (e.g., the first multimedia content item 140) is stored in the memory 202, the first device 130 may send the particular multimedia content item to the first user device 160 via the wireless network 162 (rather than the first user device 160 requesting the particular multimedia content item via the wireless communications network 102).

Figure 3:
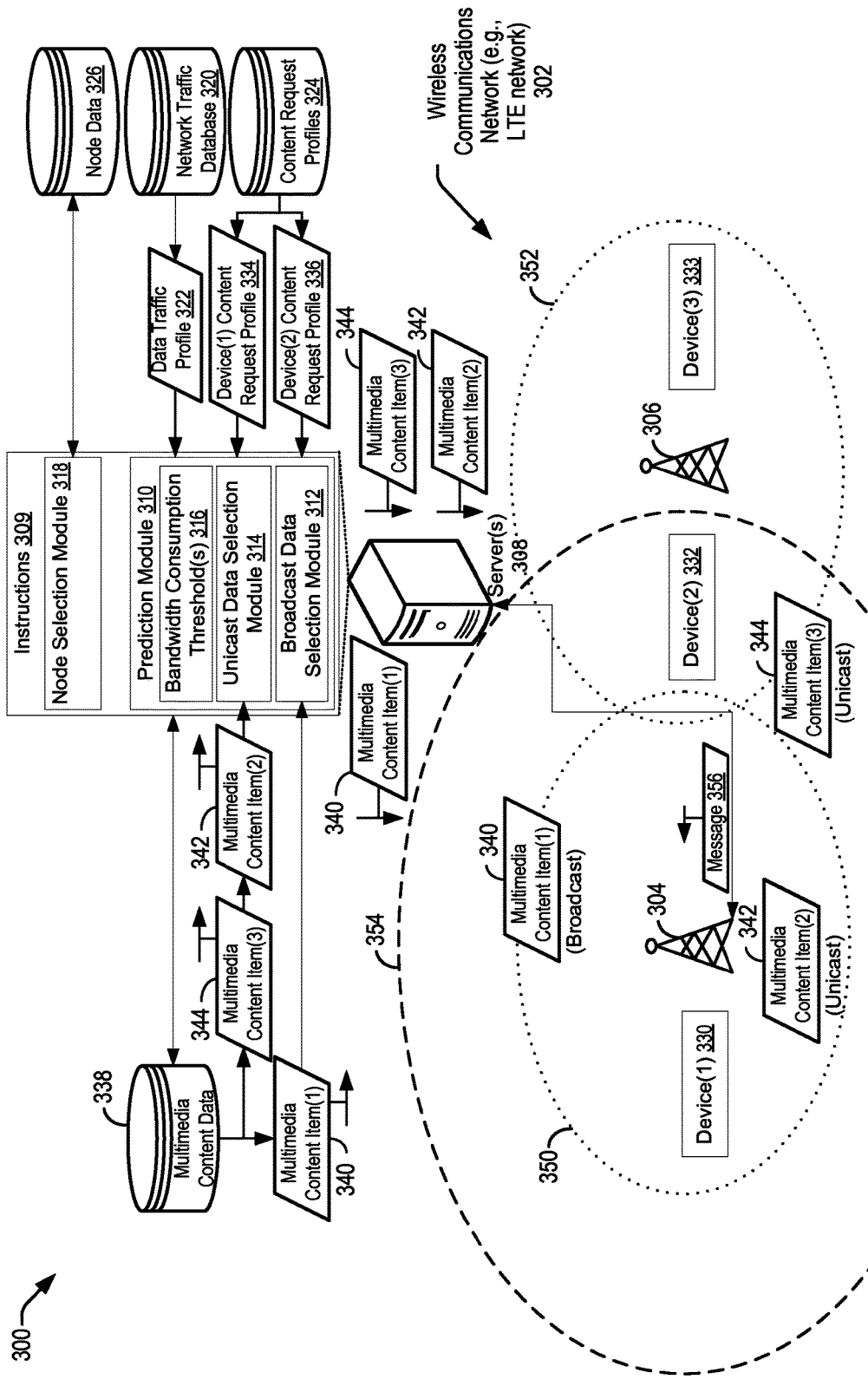
FIG. 3 is a diagram illustrating another particular embodiment of a system for conserving network bandwidth during a first time period (e.g., a peak usage period) by pre-delivering particular content item(s) to a device during a second time period (e.g., an off-peak usage period) for storage at the device.

Referring to FIG. 3, a particular embodiment of a network bandwidth conservation system is illustrated and generally designated 300. FIG. 3 illustrates a particular example of a wireless communications network 302 (e.g., an LTE network) that includes a first transmission tower 304 and a second transmission tower 306. In other embodiments, an alternative number and/or arrangement of transmission towers may be associated with the wireless communications network 302. FIG. 3 illustrates a particular embodiment in which a transmission power of a selected transmission tower (e.g., the first transmission tower 304) may be increased in order to increase a transmission range for pre-delivery of particular media content item(s) to additional device(s) via broadcast transmission(s) and via unicast transmission(s). While FIG. 3 illustrates an example of adjusting one parameter (e.g., transmission power) of a particular node, it will be appreciated that various self-organizing network (SON) functionalities may be employed. As an illustrative non-limiting example, SON functionalities may include self-configuration functions such as automatic adjustment of technical parameters (such as emission power, antenna tilt, etc.) at a particular node (e.g., base station) responsive to changes of technical parameters of neighboring node(s). Thus, various SON functionalities (e.g., emission power, antenna tilt, or a combination thereof) may allow for pre-delivery of media content items to additional devices via broadcast and/or unicast transmissions from particular nodes of the wireless communications network 302.

FIG. 3 illustrates that a server 308 (or multiple servers) may be associated with the wireless communications network 302. In the particular embodiment illustrated in FIG. 3, the server 308 includes a memory that stores instructions 309, including a prediction module 310 configured to identify particular multimedia content item(s) that are predicted to have a high likelihood of being requested during a particular time period (e.g., a peak usage period of the wireless communications network 302). The prediction module 310 may include a broadcast data selection module 312, a unicast data selection module 314, and a network bandwidth consumption threshold 316 (or multiple bandwidth consumption thresholds). The server 308 may also include a node selection module 318 (e.g., a transmission tower selection module).

FIG. 3 illustrates that data stored in one or more databases may be accessible to the server 308. In the example of FIG. 3, network traffic data 320 may be accessible to the server 308, and a data traffic profile 322 associated with the wireless communications network 302 may be determined based on the network traffic data 320. For example, the data traffic profile 322 may include data associated with a plurality of multimedia content items that were previously transmitted to multiple devices via the wireless communications network 302. The data traffic profile 322 may also identify a peak usage period associated with individual transmission towers (e.g., the first transmission tower 304 and the second transmission tower 306).

FIG. 3 further illustrates that content request profiles 324 associated with particular devices may be accessible to the server 308. In the particular embodiment illustrated in FIG. 3, a first device 330 (e.g., a first media device), a second device 332 (e.g., a second media device), and a third device 333 (e.g., a third media device) are shown. A first content request profile 334 may be associated with the first device 330, a second content request profile 336 may be associated with the second device 332, and a third content request profile (not shown) may be associated with the third device 333. In alternative embodiments, the content request profiles 324 may include an alternative number of content request profiles associated with an alternative number of devices.

FIG. 3 further illustrates that node data 326 (e.g., a transmission range and/or a transmission power associated with individual transmission towers of the wireless communications network 302) may be accessible to the server 308. In the particular embodiment illustrated in FIG. 3, a first transmission power may be associated with a first transmission range 350 of the first transmission tower 304, and a second transmission power may be associated with a second transmission range 354 of the first transmission tower 304. In the example of FIG. 3, a single transmission range 352 may be associated with the second transmission tower 306.

FIG. 3 illustrates that multimedia content data 338 may be accessible to the prediction module 310 of the server 308. In the example illustrated in FIG. 3, the broadcast data selection module 312 may identify a first multimedia content item 340 for broadcast transmission via one or more transmission towers of the wireless communications network 302. The first multimedia content item 340 satisfies a particular bandwidth consumption threshold 316. For example, the first multimedia content item 340 may be a content item that is predicted to consume more network bandwidth than other multimedia content items during a peak usage period of the wireless communications network 302. In the example illustrated in FIG. 3, the unicast data selection module 314 may identify a second multimedia content item 342 for unicast transmission to the first device 330. Further, the unicast data selection module 314 may identify a third multimedia content item 344 for unicast transmission to the second device 332.

In the example of FIG. 3, the first device 330 is located within the first transmission range 350 of the first transmission tower 304. The second device 332 is located outside of the first transmission range 350 of the first transmission tower 304. However, the second device 322 is located within the second transmission range 354 of the first transmission tower 304. The third device 333 is located within the transmission range 352 of the second transmission tower 306 and outside of the second transmission range 354 of the first transmission tower 304. FIG. 3 illustrates that increasing the transmission power of the first transmission tower 304 may allow multimedia content item(s) to be communicated for storage at additional device(s) that are outside of the first transmission range 350 but within the second transmission range 354 of the first transmission tower 304. For example, the first multimedia content item 340 may be transmitted to the first device 330 and to the second device 332 via a single MBMS broadcast transmission from the first transmission tower 304. As another example, the third multimedia content item 344 may be transmitted to the second device 332 via a unicast transmission from the first transmission tower 304.

In operation, the server 308 may determine that the first multimedia content item 340 is to be transmitted via an MBMS broadcast transmission. The prediction module 310 may identify the first multimedia content item 340 based on the data traffic profile 322. The unicast data selection module 314 may determine that the second multimedia content item 342 is to be transmitted to the first device 330 via a unicast transmission. The unicast data selection module 314 may identify the second multimedia content item 342 based on the content request profile 334 associated with the first device 330. As another example, the unicast data selection module 314 may determine that the third multimedia content item 344 is to be transmitted to the second device 332 via a unicast transmission. The unicast data selection module 314 may identify the third multimedia content item 344 based on the content request profile 336 associated with the second device 332.

The node selection module 318 may select the first transmission tower 304 to transmit the first multimedia content item 340 via an MBMS broadcast transmission (e.g., an eMBMS broadcast transmission). The node selection module 318 may determine the first transmission range 350 associated with the first transmission tower 304 based on the node data 326. The server 308 may determine whether a particular device is located outside of the first transmission range 350 (e.g., based on information associated with the particular device). In some cases, the location of the particular device may be communicated to the server 308 (e.g., as GPS coordinates) from the particular device. In other cases, the server 308 may determine the location of the particular device (e.g., based on an address associated with a particular customer or based on triangulation data, among other alternatives). As an example, the server 308 may determine that the first device 330 is within the first transmission range 350 of the first transmission tower 304. As another example, the server 308 may determine that the second device 332 is outside of the first transmission range 350 of the first transmission tower 304. As a further example, the server 308 may determine that the third device 333 is outside of the first transmission range 350 of the first transmission tower 304.

In response to determining that the second device 332 and the third device 333 are outside of the first transmission range 350 of the first transmission tower 304, the node selection module 318 may determine whether the second device 332 and/or the third device 333 are outside of the second transmission range 352 (e.g., based on the location of the second device 332 and based on the location of the third device 333). In the example illustrated in FIG. 3, the server 308 may determine that the second device 332 is within the second transmission range 354 of the first transmission tower 304, while the third device 333 is outside of the second transmission range 354 of the first transmission tower 304.

In response to determining that the second device 332 is within the second transmission range 354 of the first transmission tower 304, the server 308 may send a message 356 to the first transmission tower 304 (e.g., via a wired connection, a wireless connection, or a combination thereof), instructing the first transmission tower 304 to transmit particular media content item(s) at a second transmission power (associated with the second transmission range 354). In some cases, a first antenna may be associated with the first transmission range 350, and a second antenna may be associated with the second transmission range 354. After receiving the message 356 from the server 208, the first transmission tower 304 may adjust a transmission power of a particular antenna or select a particular antenna for broadcast transmission of the first multimedia content item 340. Further, after receiving the message 356 from the server 308, the first transmission tower 304 may adjust a transmission power of a particular antenna or select a particular antenna for unicast transmission of the third multimedia content item 344 to the second device 332. In some cases, the first transmission tower 304 may transmit the second multimedia content item 342 to the first device 330 via the unicast transmission at the first transmission power (e.g., the lower transmission power associated with the first transmission range 350).

The server 308 may send the first multimedia content item 340 and the second multimedia content item 342 to the first transmission tower 304. To illustrate, the server 308 may retrieve the first multimedia content item 340 and the second multimedia content item 342 from the multimedia content data 338 and may send the first multimedia content item 340 and the second multimedia content item 342 to the first transmission tower 304 (e.g., via a wired connection, a wireless connection, or a combination thereof). As another example, the server 308 may send the third multimedia content item 344 to the first transmission tower 304 (for unicast transmission to the second device 332). To illustrate, the server 308 may retrieve the third multimedia content item 344 from the multimedia content data 338 and may send the third multimedia content item 344 to the first transmission tower 304 (e.g., via a wired connection, a wireless connection, or a combination thereof).

Thus, FIG. 3 illustrates that increasing a transmission power of a selected transmission tower (e.g., the first transmission tower 304) in order to increase a transmission range (e.g., from the first transmission range 350 to the second transmission range 354) may allow for pre-delivery of particular media content item(s) to additional device(s) via MBMS broadcast transmission(s) and/or unicast transmission(s) from the selected transmission tower.

Figure 4:
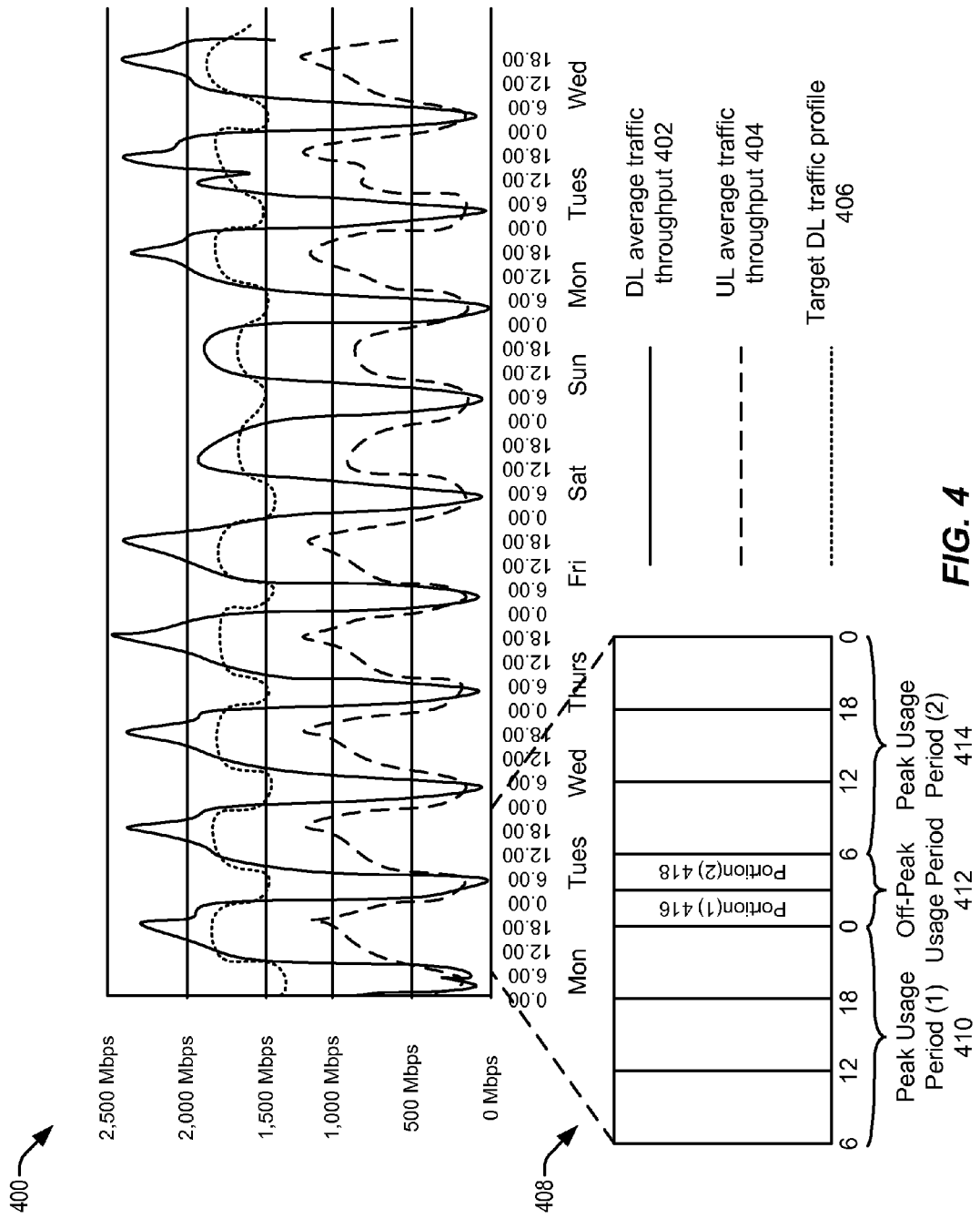
FIG. 4 is a diagram illustrating an example of a data traffic profile associated with a wireless communications network to be used to determine time period(s) for broadcast transmission(s) and unicast transmission(s) of particular multimedia content item(s)

Referring to FIG. 4, an illustrative example of a data traffic profile associated with a wireless communications network is illustrated and generally designated 400. The data traffic profile 400 may be used to determine time period(s) for broadcast transmission(s) and unicast transmission(s) of particular multimedia content item(s). In a particular embodiment, the data traffic profile 400 illustrated in FIG. 4 may correspond to the data traffic profile 122 of FIG. 1 or 2 and/or the data traffic profile 322 of FIG. 3.

FIG. 4 illustrates that the data traffic profile 400 may be associated with a particular network node (e.g., a NodeB site) and may include a downlink (DL) traffic average throughput 402 and an uplink (UL) traffic average throughput 404. The DL traffic volume is typically higher than the UL traffic volume (e.g., more than twice the UL traffic volume). FIG. 4 illustrates that the DL traffic volume may "spike" upwards between the hours of 12 PM and 6 PM. Network nodes are typically designed to accommodate the highest peak traffic load. FIG. 4 further illustrates that the DL traffic volume at off-peak hours may be significantly lower than the DL traffic volume at peak hours (e.g., less than 25 percent of the peak volume). In the system of the present disclosure, content that is expected to be consumed during peak hours may be "pushed" closer to a user device during the off-peak hours. FIG. 4 illustrates that pre-delivery of content may allow the DL traffic volume to approach a target DL traffic profile 406 with a reduced traffic variation between an off-peak usage period and a peak usage period.

For illustrative purposes, a portion 408 of the data traffic profile 400 associated with midnight on Monday to 6 AM on Tuesday is illustrated in further detail for discussion purposes. The portion 408 includes a first peak usage period 410 on Monday (e.g., between about 6 AM on Monday and about midnight), an off-peak usage period 412 (e.g., between about midnight and about 6 AM on Tuesday), and a second peak usage period 414 on Tuesday (e.g., after about 6 AM on Tuesday). FIG. 4 illustrates that, in some cases, a first portion 416 of the off-peak usage period 412 may be designated for MBMS broadcast transmission(s), while a second portion 418 of the off-peak usage period 412 may be designated for unicast transmission(s) to particular device(s). In a particular embodiment, particular data usage information associated with the first peak usage period 410 on Monday may be used to identify multimedia content item(s) for pre-delivery during the off-peak usage period 412 (to be stored in a memory for retrieval during the second peak usage period 414 on Tuesday).

As an illustrative, non-limiting example, referring to FIGS. 1 and 2, the first transmission tower 104 may transmit the first multimedia content item 140 and the Nth multimedia content item 146 (e.g., the multimedia content items identified for MBMS broadcast transmission) during the first portion 416 of the off-peak usage period 412. As another example, referring to FIG. 1, the second transmission tower 106 may transmit the first multimedia content item 140 and the Nth multimedia content item 146 (e.g., the multimedia content items identified for MBMS broadcast transmission) during the first portion 416 of the off-peak usage period 412. As a further example, referring to FIG. 3, the first transmission tower 304 may transmit the first multimedia content item 340 (e.g., the multimedia content item identified for MBMS broadcast transmission) during the first portion 416 of the off-peak usage period 412.

As another illustrative, non-limiting example, referring to FIGS. 1 and 2, the first transmission tower 104 may transmit the second multimedia content item 142 (e.g., the multimedia content item identified for unicast transmission to the first device 130) during the second portion 418 of the off-peak usage period 412. As another example, referring to FIG. 1, the second transmission tower 106 may transmit the third multimedia content item 144 (e.g., the multimedia content item identified for unicast transmission to the second device 132) during the second portion 418 of the off-peak usage period 412.

As a further example, referring to FIG. 3, the first transmission tower 304 may transmit the second multimedia content item 342 (e.g., the multimedia content item identified for unicast transmission to the first device 330) during the second portion 418 of the off-peak usage period 412. The first transmission tower 304 may further transmit the third multimedia content item 344 (e.g., the multimedia content item identified for unicast transmission to the second device 332) during the second portion 418 of the off-peak usage period 412. In some cases, the order in which particular multimedia content item(s) are transmitted via unicast transmission(s) and/or the order in which particular multimedia content item(s) are transmitted to particular device(s) may vary. To illustrate, transmission of the second multimedia content item 342 to the first device 330 may represent a higher priority than transmission of the third multimedia content item 344 to the second device 322, or vice versa. As another example, transmission of multimedia content items to the first device 330 may represent a higher priority than transmission of multimedia content items to the second device 332, or vice versa.

Thus, FIG. 4 illustrates that the additional network capacity available during an off-peak usage period (e.g., the off-peak usage period 412) may allow for pre-delivery of content that is predicted to have a high likelihood of being consumed during a subsequent peak usage period (e.g., the second peak usage period 414 on Tuesday). Pre-delivery of content during an off-peak usage period may allow the DL traffic volume to approach the target DL traffic profile 406 with a reduced traffic variation between an off-peak usage period and a peak usage period. The first portion 416 of the off-peak usage period 412 may allow for pre-delivery of multimedia content item(s) that are predicted to have a high likelihood of being requested by multiple devices during a peak usage period (e.g., a "top ten list" of requested items for all users). The second portion 418 of the off-peak usage period 418 may allow for pre-delivery of multimedia content item(s) that are predicted to have a high likelihood of being requested by a particular device or a group of devices (e.g., based on traffic at an access point) during a peak usage period (e.g., a "top ten list" of items that are likely to be consumed at the particular device). In either case, pre-delivery of content during an off-peak usage period may conserve network bandwidth resources during a peak usage period.

Figure 5:
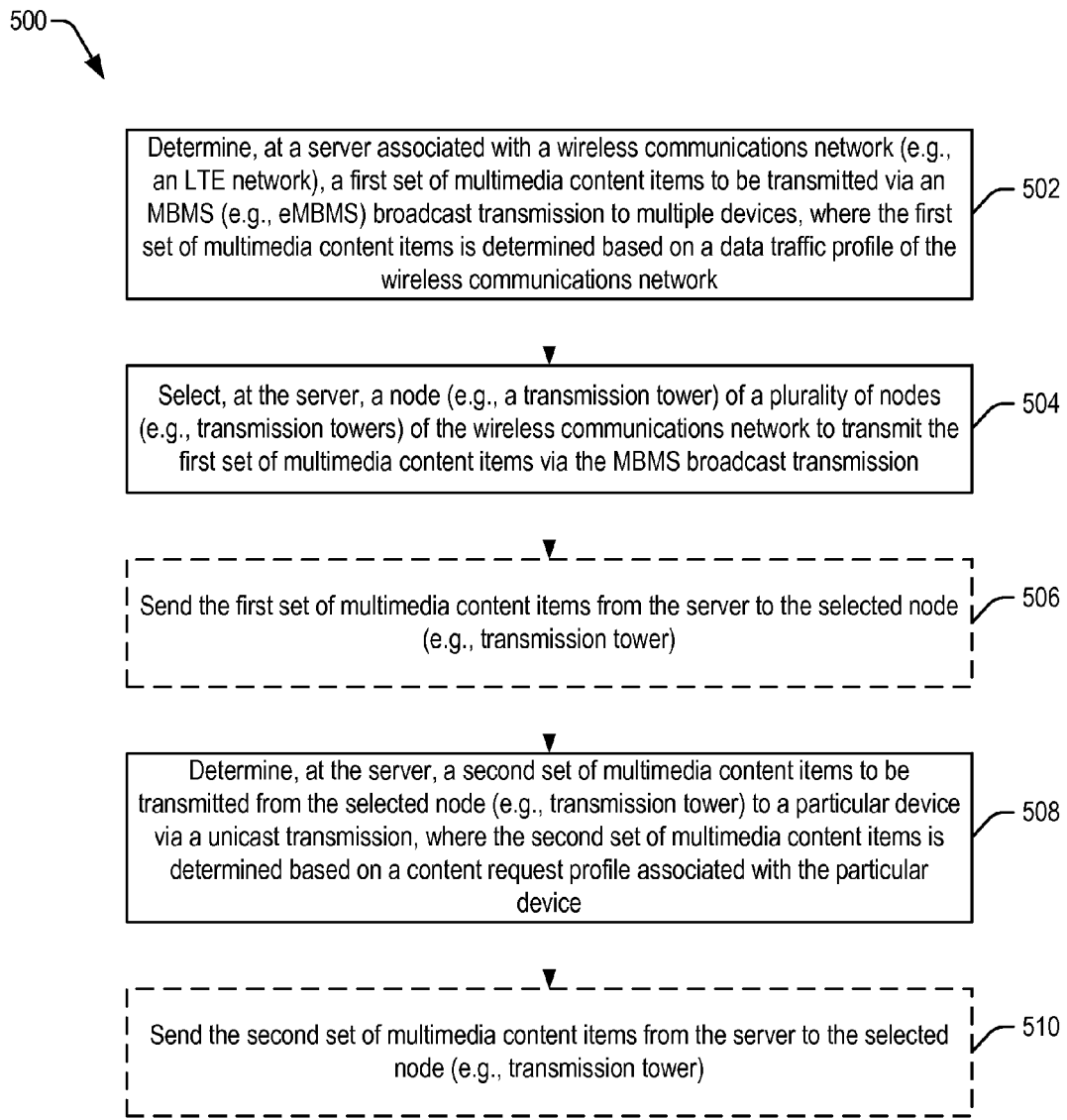
FIG. 5 is a flow diagram that illustrates a particular embodiment of a method for determining content item(s) to be transmitted via broadcast transmission(s) based on a data traffic profile and for determining content item(s) to be transmitted to a particular device via unicast transmission(s) based on a content request profile associated with the particular device.

FIG. 5 illustrates a particular embodiment of a method 500 for determining a first set of multimedia content item(s) to be transmitted via MBMS broadcast transmission(s) based on a data traffic profile and for determining a second set of multimedia content item(s) to be transmitted to a particular device via unicast transmission(s) based on a content request profile associated with the particular device.

The method 500 includes determining, at a server associated with a wireless communications network, a first set of multimedia content items (including one or more items) to be transmitted via an MBMS broadcast transmission to multiple devices, at 502. The first multimedia content item is determined based on a data traffic profile of the wireless communication network. For example, referring to FIG. 1, the server 108 associated with the wireless communications network 102 may determine that the first multimedia content item 140 is to be transmitted via an MBMS broadcast transmission. The prediction module 110 of the server 108 may identify the first multimedia content item 140 based on the data traffic profile 122. As another example, referring to FIG. 3, the server 308 associated with the wireless communications network 302 may determine that the first multimedia content item 340 is to be transmitted via an MBMS broadcast transmission. The prediction module 310 of the server 308 may identify the first multimedia content item 340 based on the data traffic profile 322.

The method 500 includes selecting, at the server, a node (e.g., a transmission tower) of a plurality of nodes (e.g., transmission towers) of the wireless communications network to transmit the first set of multimedia content items via the MBMS broadcast transmission, at 504. For example, referring to FIG. 1, the node selection module 118 may select the first transmission tower 104 to transmit the first multimedia content item 140 via an MBMS broadcast transmission (to one or more devices within the transmission range 150 of the first transmission tower 104). As a further example, referring to FIG. 3, the node selection module 318 of the server 308 may select the first transmission tower 304 to transmit the first multimedia content item 340 via an MBMS broadcast transmission (to one or more devices within the second transmission range 354 of the first transmission tower 304).

The method 500 may include sending the first set of multimedia content items from the server to the selected transmission tower, at 506. For example, referring to FIG. 1, the server 108 may retrieve the first multimedia content item 140 from the multimedia content data 138 and may send the first multimedia content item 140 to the first transmission tower 104 (e.g., via a wired connection, a wireless connection, or a combination thereof). As a further example, referring to FIG. 3, the server 308 may retrieve the first multimedia content item 340 from the multimedia content data 338 and may send the first multimedia content item 340 to the first transmission tower 304 (e.g., via a wired connection, a wireless connection, or a combination thereof).

The method 500 further includes determining, at the server, a second set of multimedia content items (including one or more items) to be transmitted from the selected transmission tower to a particular device via a unicast transmission, at 508. The second set of multimedia content items is determined based on a content request profile associated with the particular device. For example, referring to FIG. 1, the unicast data selection module 114 of the server 108 may determine that the second multimedia content item 142 is to be transmitted to the first device 130 via a unicast transmission (from the first transmission tower 104). The unicast data selection module 114 may identify the second multimedia content item 142 based on the content request profile 134 associated with the first device 130. As another example, referring to FIG. 3, the unicast data selection module 314 of the server 308 may determine that the second multimedia content item 342 is to be transmitted to the first device 330 via a unicast transmission (from the first transmission tower 304). The unicast data selection module 314 may identify the second multimedia content item 342 based on the content request profile 334 associated with the first device 330.

The method 500 may include sending the second set of multimedia content items from the server to the selected transmission tower, at 510. For example, referring to FIG. 1, the server 108 may retrieve the second multimedia content item 142 from the multimedia content data 138 and may send the second multimedia content item 142 to the first transmission tower 104 (e.g., via a wired connection, a wireless connection, or a combination thereof). As a further example, referring to FIG. 3, the server 308 may retrieve the second multimedia content item 342 from the multimedia content data 338 and may send the second multimedia content item 342 to the first transmission tower 304 (e.g., via a wired connection, a wireless connection, or a combination thereof).

Thus, FIG. 5 illustrates that multimedia content item(s) may be pre-delivered to multiple devices via a broadcast transmission and to a particular device via a unicast transmission (e.g., during an off-peak usage period). Pre-delivery of particular multimedia content item(s) that are predicted to have a high likelihood of being requested during a peak usage period may conserve network bandwidth of a wireless communications network during the peak usage period.

Figure 6:
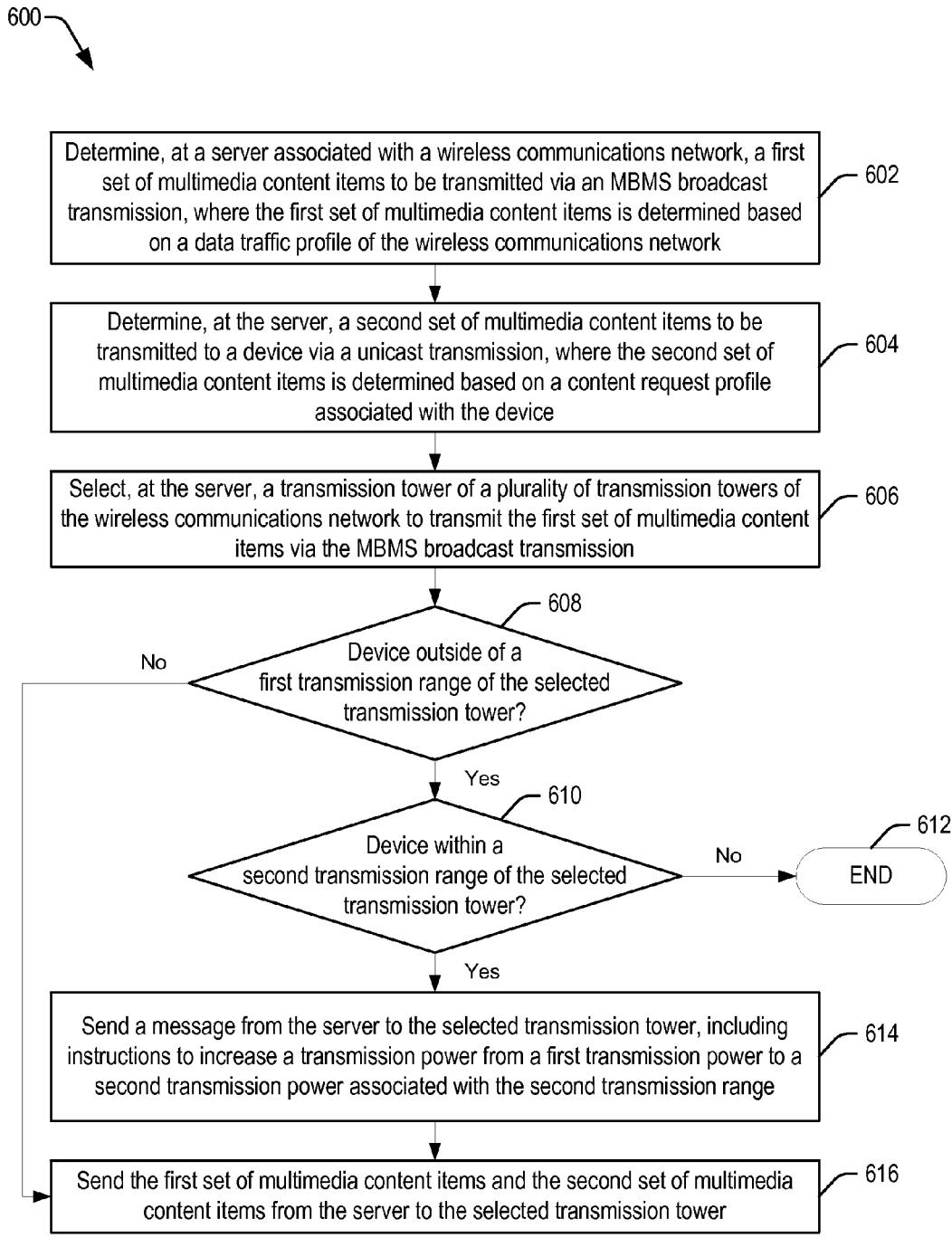
FIG. 6 is a flow diagram that illustrates a particular embodiment of a method for determining whether to adjust a transmission power of a transmission tower that is selected for transmitting media content item(s) via broadcast transmission(s) and via unicast transmission(s) based on a location of a particular device with respect to the selected transmission tower.

FIG. 6 illustrates a particular embodiment of a method 600 for determining whether to adjust a transmission power of a transmission tower that is selected for transmitting media content item(s) via MBMS broadcast transmission(s) and via unicast transmission(s) based on a location of a particular device with respect to the selected transmission tower. FIG. 6 illustrates that a transmission power of the selected transmission tower may be increased in order to increase a transmission range for pre-delivery of particular media content item(s) to additional device(s) via MBMS broadcast transmission(s) and/or unicast transmission(s) from the selected transmission tower.

The method 600 includes determining, at a server associated with a wireless communications network, a first set of multimedia content items (including one or more items) to be transmitted via an MBMS broadcast transmission, at 602. The first set of multimedia content items is determined based on a data traffic profile of the wireless communication network. For example, referring to FIG. 3, the server 308 associated with the wireless communications network 302 may determine that the first multimedia content item 340 is to be transmitted via an MBMS broadcast transmission. The prediction module 310 of the server 308 may identify the first multimedia content item 340 based on the data traffic profile 322.

The method 600 includes determining, at the server, a second set of multimedia content items (including one or more items) to be transmitted to a device via a unicast transmission, at 602. The second set of multimedia content items is determined based on a content request profile associated with the device. For example, referring to FIG. 3, the unicast data selection module 314 of the server 308 may determine that the second multimedia content item 342 is to be transmitted to the first device 330 via a unicast transmission. The unicast data selection module 314 may identify the second multimedia content item 342 based on the content request profile 334 associated with the first device 330. As another example, the unicast data selection module 314 may determine that the third multimedia content item 344 is to be transmitted to the second device 332 via a unicast transmission. The unicast data selection module 314 may identify the third multimedia content item 344 based on the content request profile 336 associated with the second device 332.

The method 600 includes selecting, at the server, a transmission tower of a plurality of transmission towers of the wireless communications network to transmit the first set of multimedia content items via the MBMS broadcast transmission, at 606. For example, referring to FIG. 3, the node selection module 318 of the server 308 may select the first transmission tower 304 to transmit the first multimedia content item 340 via an MBMS broadcast transmission.

The method 600 includes determining whether the device is outside of a first transmission range of the selected transmission tower, at 608. For example, referring to FIG. 3, the node selection module 318 may determine the first transmission range 350 associated with the first transmission tower 304 based on the node data 326. The server 308 may determine whether a particular device is outside of the first transmission range 350 (e.g., based on a location of the particular device). In some cases, the location of the particular device may be communicated to the server 308 (e.g., as GPS coordinates). In other cases, the server 308 may determine the location of the particular device (e.g., based on an address associated with a particular customer or based on triangulation data, among other alternatives). As an example, the server 308 may determine that the first device 330 is within the first transmission range 350 of the first transmission tower 304. As another example, the server 308 may determine that the second device 332 is outside of the first transmission range 350 of the first transmission tower 304. As a further example, the server 308 may determine that the third device 333 is outside of the first transmission range 350 of the first transmission tower 304.

In response to determining that the device is within the first transmission range of the selected transmission tower, the method 600 may proceed to 616, where the server may send the first set of multimedia content items and the second set of multimedia content items to the selected transmission tower (for transmission at the first transmission power). For example, referring to FIG. 3, the server 308 may send the first multimedia content item 340 and the second multimedia content item 342 to the first transmission tower 304 in response to determining that the first device 330 is within the first transmission range 350 of the first transmission tower 304. To illustrate, the server 308 may retrieve the first multimedia content item 340 and the second multimedia content item 342 from the multimedia content data 338 and may send the first multimedia content item 340 and the second multimedia content item 342 to the first transmission tower 304 (e.g., via a wired connection, a wireless connection, or a combination thereof).

In response to determining that the device is outside of the first transmission range of the selected transmission tower, the method 600 may include determining whether the device is within a second transmission range of the selected transmission tower, at 610. For example, referring to FIG. 3, in response to determining that the second device 332 and the third device 333 are outside of the first transmission range 350 of the first transmission tower 304, the node selection module 318 may determine the second transmission range 352 associated with the first transmission tower 304 based on the node data 326. The server 308 may determine whether the second device 332 and the third device 333 are outside of the second transmission range 352 (e.g., based on the location of the second device 332 and the location of the third device 333). In the example illustrated in FIG. 3, the second device 332 is shown as being within the second transmission range 354 of the first transmission tower 304, while the third device 333 is shown as being outside of the second transmission range 354 of the first transmission tower 304.

In response to determining that the device is outside of the second transmission range of the selected transmission tower, the method 600 may end (as shown at 612). For example, referring to FIG. 3, the server 308 may not transmit data for unicast transmission to the third device 333 via the first transmission tower 304 in response to determining that the third device 333 is outside of the second transmission range 354 of the first transmission tower 304. In some cases, while not illustrated in the example of FIG. 3, the server 308 may determine, based on the data traffic profile 322, whether multimedia content item(s) are to be sent to the second transmission tower 306 (for transmission to the third device 333 via one or more unicast transmissions).

In response to determining that the device is within the second transmission range of the selected transmission tower, the method 600 may include sending a message from the server to the selected transmission tower, at 614. The message may include instructions to increase a transmission power to a second transmission power associated with the second transmission range. For example, referring to FIG. 3, the server 308 may send the message 356 to the first transmission tower 304 (e.g., via a wired connection, a wireless connection, or a combination thereof), instructing the first transmission tower 304 to transmit particular media content item(s) at a second transmission power (associated with the second transmission range 354). In some cases, a first antenna may be associated with the first transmission range 350, and a second antenna may be associated with the second transmission range 354. After receiving the message 356 from the server 208, the first transmission tower 304 may adjust a transmission power of a particular antenna or select a particular antenna for broadcast transmission of the first multimedia content item 340. Further, after receiving the message 356 from the server 308, the first transmission tower 304 may adjust a transmission power of a particular antenna or select a particular antenna for unicast transmission of the third multimedia content item 344 to the second device 332. In some cases, the first transmission tower 304 may transmit the second multimedia content item 342 to the first device 330 via the unicast transmission at the first transmission power (e.g., the lower transmission power associated with the first transmission range 350).

The method 600 includes sending the first set of multimedia content items and the second set of multimedia content items from the server to the selected transmission tower, at 616. For example, referring to FIG. 3, the server 308 may send the first multimedia content item 340 and the second multimedia content item 342 to the first transmission tower 304. To illustrate, the server 308 may retrieve the first multimedia content item 340 and the second multimedia content item 342 from the multimedia content data 238 and may send the first multimedia content item 340 and the second multimedia content item 342 to the first transmission tower 304 (e.g., via a wired connection, a wireless connection, or a combination thereof). As another example, the server 308 may send the third multimedia content item 344 to the first transmission tower 304 (for unicast transmission to the second device 332). To illustrate, the server 308 may retrieve the third multimedia content item 344 from the multimedia content data 338 and may send the third multimedia content item 344 to the first transmission tower 304 (e.g., via a wired connection, a wireless connection, or a combination thereof).

Thus, FIG. 6 illustrates that increasing a transmission power of a selected transmission tower (e.g., the first transmission tower 304) in order to increase a transmission range (e.g., from the first transmission range 350 to the second transmission range 354) may allow for pre-delivery of particular media content item(s) to additional device(s) via MBMS broadcast transmission(s) and/or unicast transmission(s) from the selected transmission tower.

Figure 7:
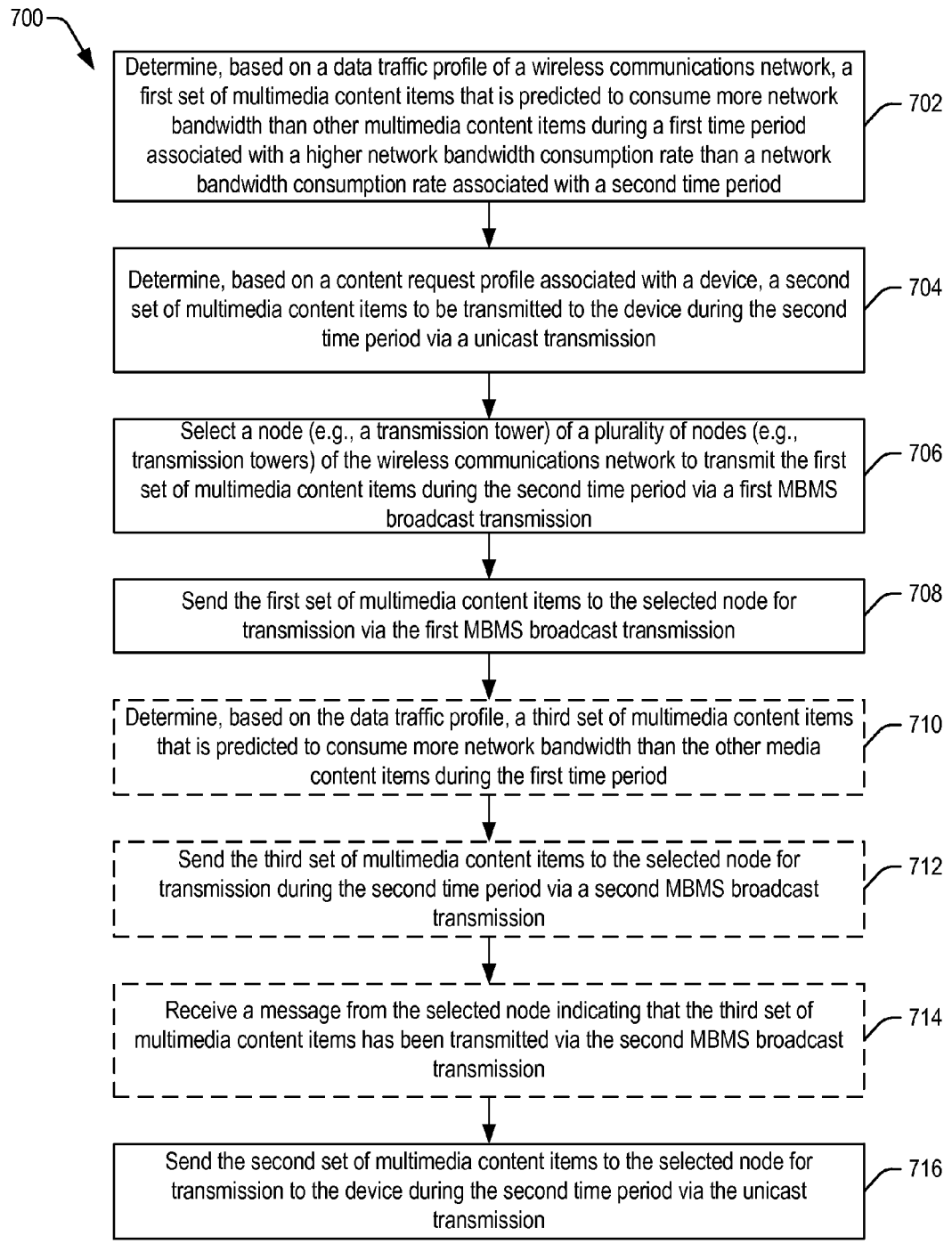
FIG. 7 is a flow diagram that illustrates a particular embodiment of a method for determining media content item(s) to be transmitted via broadcast transmission(s) based on a data traffic profile and for determining media content item(s) to be transmitted to a particular device via unicast transmission(s) based on a content request profile associated with the particular device.

FIG. 7 illustrates a particular embodiment of a method 700 for determining media content item(s) to be transmitted via MBMS broadcast transmission(s) based on a data traffic profile and for determining multimedia content item(s) to be transmitted to a particular device via unicast transmission(s) based on a content request profile associated with the particular device (after the media content item(s) identified for broadcasting have been transmitted). In the particular embodiment illustrated in FIG. 7, multimedia content item(s) that are identified for broadcast transmission may represent higher priority content items than multimedia content item(s) that are identified for unicast transmission. A server may wait to receive a message from a selected transmission tower indicating the broadcast media item(s) have been transmitted before sending multimedia content item(s) to the selected transmission tower for unicast transmission.

The method 700 includes determining, based on a data traffic profile of a wireless communications network, a first set of multimedia content items (including one or more items) that is predicted to consume more network bandwidth than other media content items during a first time period, at 702. The first time period (e.g., a peak usage period) may be associated with a higher network bandwidth consumption rate than a network bandwidth consumption rate associated with a second time period (e.g., an off-peak usage period). For example, referring to FIG. 1, the prediction module 110 of the server 108 may determine, based on the data traffic profile 122 associated with the wireless communications network 102, that the first multimedia content item 140 is predicted to consume more network bandwidth than other media content items during a first time period.

The method 700 includes determining a second set of multimedia content items (including one or more items) to be transmitted to a device during the second time period via a unicast transmission, at 704. The second set of multimedia content items may be determined based on a content request profile associated with the device. For example, referring to FIG. 1, the prediction module 110 of the server 108 may determine the second multimedia content item 142 to the transmitted to the first device 130 during the second time period via a unicast transmission. The prediction module 110 may identify the second multimedia content item 142 for unicast transmission to the first device 130 based on the content request profile 134 associated with the first device 130.

The method 700 includes selecting a node (e.g., a transmission tower) of a plurality of nodes (e.g., transmission towers) of the wireless communications network to transmit the first set of multimedia content items during the second time period via a first MBMS broadcast transmission, at 706. For example, referring to FIG. 1, the node selection module 118 of the server 108 may select the first transmission tower 104 of the wireless communications network 102 (e.g., an LTE network) to transmit the first multimedia content item 140 during the second time period via a first MBMS broadcast transmission (e.g., a first eMBMS broadcast transmission).

The method 700 includes sending the first set of multimedia content items to the selected node (e.g., transmission tower) for transmission via the first MBMS broadcast transmission, at 708. For example, referring to FIG. 1, the server 108 may send the first multimedia content item 140 to the first transmission tower 104 (e.g., via a wired connection, a wireless connection, or a combination thereof) for transmission via the first MBMS broadcast transmission.

In the particular embodiment illustrated in FIG. 7, the method 700 may include determining, based on the data traffic profile, a third set of multimedia content items (including one or more items) that is predicted to consume more network bandwidth resources than the other media content items during the first time period, at 710. For example, referring to FIG. 1, the server 108 may determine, based on the data traffic profile 122, that the Nth multimedia content item 146 is predicted to consume more network bandwidth resources than the other media content items during the first time period.

In the particular embodiment illustrated in FIG. 7, the method 700 may include sending the third set of multimedia content items to the selected node (e.g., transmission tower), at 712. The third set of multimedia content items is to be transmitted from the selected node (e.g., transmission tower) during the second time period via a second MBMS broadcast transmission. For example, referring to FIG. 1, the server 108 may send the Nth multimedia content item 146 to the first transmission tower 104 for transmission during the second time period via a second MBMS broadcast transmission (e.g., a second eMBMS broadcast transmission).

In the particular embodiment illustrated in FIG. 7, the method 700 may include receiving a message from the selected node (e.g., transmission tower), at 714. The message may indicate that the third set of multimedia content items has been transmitted via the second MBMS broadcast transmission. For example, referring to FIG. 1, the server 108 may receive a message (not shown in FIG. 1) from the first transmission tower 104 that indicates that the Nth multimedia content item 146 has been transmitted via the second MBMS broadcast transmission.

The method 700 may include sending the second set of multimedia content items to the selected node (e.g., after receiving the message indicating that the third set of multimedia content items has been transmitted), at 716. The second set of multimedia content items is to be transmitted from the selected node (e.g., transmission tower) to the device during the second time period via the unicast transmission. For example, referring to FIG. 1, the server 108 may send the second multimedia content item 142 to the first transmission tower 104 (after receiving an indication from the first transmission tower 104 that MBMS broadcast transmission of the multimedia content items 140, 146 is complete).

Thus, FIG. 7 illustrates that multimedia content item(s) that are identified for broadcast transmission may be assigned a higher priority for transmission than multimedia content item(s) that are identified for unicast transmission. A server may wait to receive a message from a selected node (e.g., transmission tower) indicating the broadcast media item(s) have been transmitted before sending multimedia content item(s) to the selected node for unicast transmission.

Figure 8:
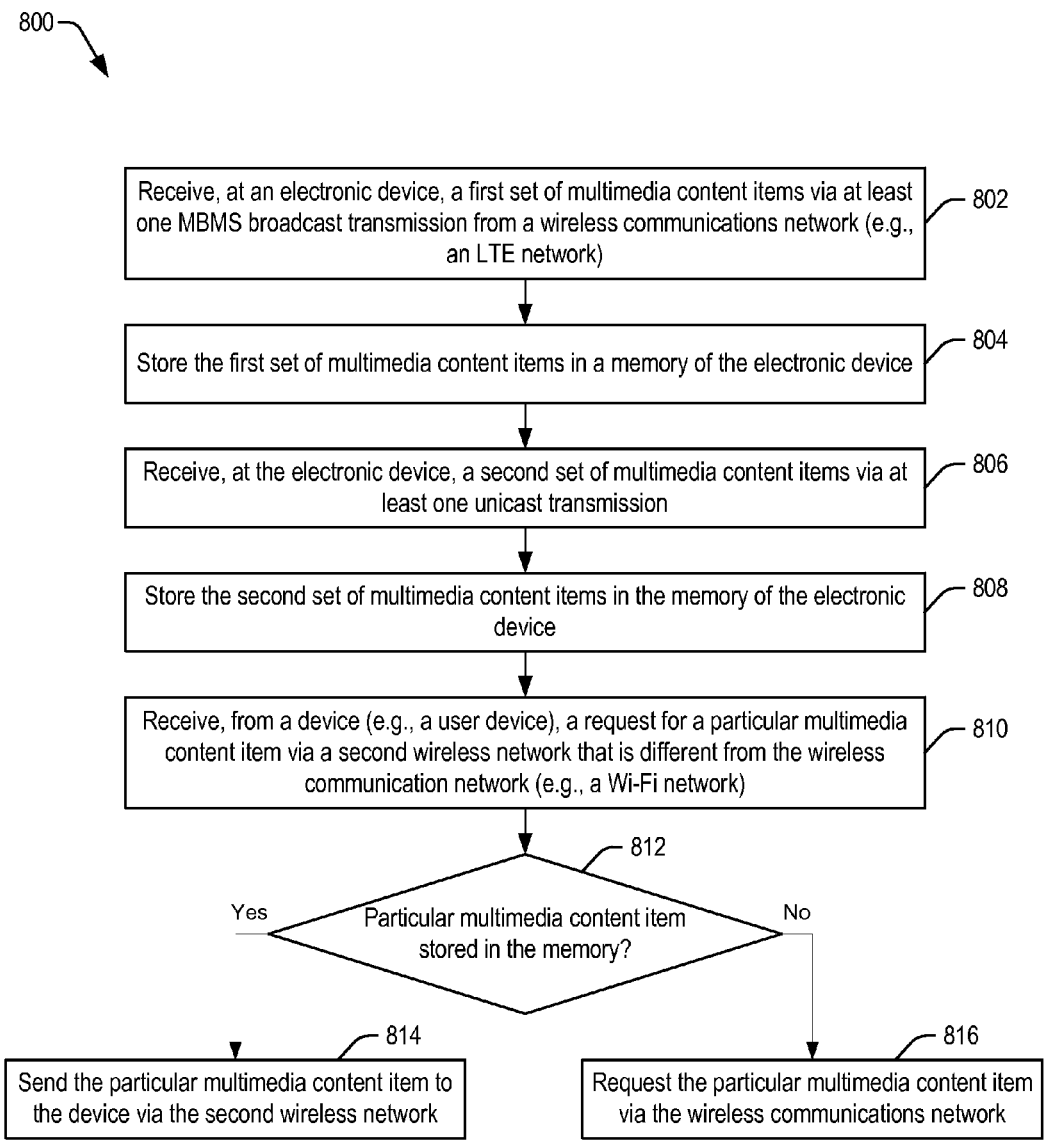
FIG. 8 is a flow diagram that illustrates a particular embodiment of a method for determining whether a particular requested media content item has been received and stored at a media device (e.g., during an off-peak usage period) for subsequent retrieval by an electronic device (e.g., during a peak usage period)

FIG. 8 illustrates a particular embodiment of a method 800 for determining whether a particular requested media content item has been received and stored at an electronic device (e.g., during an off-peak usage period) for subsequent retrieval by another device (e.g., by a user device during a peak usage period). In FIG. 8, multimedia content item(s) that are pre-delivered to device(s) via a wireless communications network may be retrieved from a memory of a particular device in response to receiving a request for a particular multimedia content item. Rather than utilize network bandwidth of the wireless communications network (e.g., an LTE network) to retrieve the particular multimedia content item (e.g., during a peak usage period), the pre-delivered content may be provided to a user device via another wireless network (e.g., a Wi-Fi network).

The method 800 includes receiving a first set of multimedia content items (including one or more items) at an electronic device, at 802. The electronic device may receive the first set of multimedia content items via at least one MBMS broadcast transmission (e.g., an eMBMS broadcast transmission) from a wireless communications network (e.g., an LTE network). For example, referring to FIG. 2, the first device 130 may receive the first set 206 of multimedia content items (e.g., the first multimedia content item 140 and optionally the Nth multimedia content item 146) via MBMS broadcast transmission(s) from the first transmission tower 104 of the wireless communications network 102. The method 800 includes storing the first set of multimedia content items in a memory of the electronic device, at 804. For example, referring to FIG. 2, the first device 130 may store the first multimedia content item 140 and the Nth multimedia content item 146 in the memory 202.

The method 800 includes receiving a second set of multimedia content items (including one or more items) at the electronic device, at 806. The second set of multimedia content items may be received via at least one unicast transmission. For example, referring to FIG. 2, the first device 130 may receive the first set 208 of multimedia content items (e.g., the second multimedia content item 142) via a unicast transmission from the first transmission tower 104 of the wireless communications network 102. The method 800 includes storing the second set of multimedia content items in the memory of the electronic device, at 808. For example, referring to FIG. 2, the first device 130 may store the second multimedia content item 142 in the memory 202.

The method 800 includes receiving a request for a particular media content item from a device (e.g., a user device), at 810. The request may be received via a second wireless network that is different from the wireless communications network. For example, referring to FIG. 2, the first user device 160 may send the request 204 to the first device 130 via the wireless network 162 (e.g., a Wi-Fi network) that is different from the wireless communications network 102 (e.g., the LTE network).

The method 800 includes determining whether the particular media content item is stored in the memory of the electronic device, at 812. For example, referring to FIG. 2, the request 204 from the first user device 160 includes a request for the first multimedia content item 140. The first device 130 may access the memory 202 to determine whether the particular media content item (e.g., the first multimedia content item 140) is stored in the memory 202. In response to determining that the particular media content item is stored in the memory, the method 800 may include sending the particular media content item to the device via the wireless network (e.g., the Wi-Fi network), at 814. For example, referring to FIG. 2, the first device 130 may determine that the first multimedia content item 140 is stored in the memory 202 (e.g., in the first set 206 of media content items). In the example illustrated in FIG. 2, the first device 130 may retrieve the first multimedia content item 140 from the memory 202 and send the first multimedia content item 140 to the first user device 160.

In response to determining that the particular media content item is not stored in the memory, the method 800 may include requesting the particular media content item via the wireless communications network (e.g., the LTE network), at 816. For example, while not shown in FIG. 2, the first user device 160 may request the particular media content item (e.g., item N) via the wireless communications network 102 when the requested media content item is not stored in the memory 202 of the first device 130.

Thus, FIG. 8 illustrates that pre-delivery of multimedia content item(s) to device(s) of a wireless communications network may allow the item(s) to be retrieved from a memory of a particular device in response to receiving a request for a particular multimedia content item. Rather than utilize network bandwidth of the wireless communications network (e.g., an LTE network) to retrieve the particular multimedia content item (e.g., during a peak usage period), the pre-delivered content may be provided to a user device via another wireless network (e.g., a Wi-Fi network).

Figure 9:
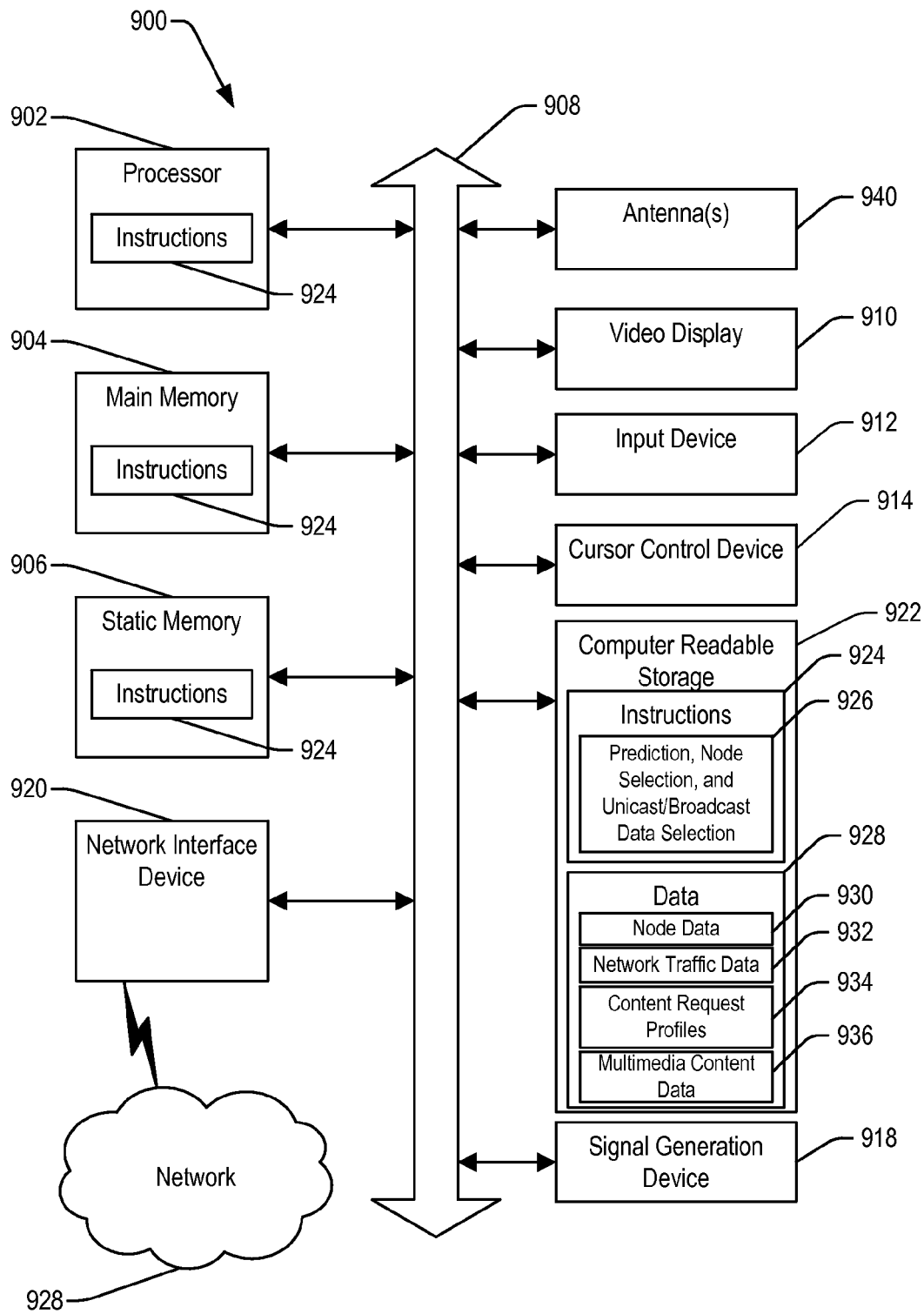
FIG. 9 is a block diagram of an illustrative embodiment of a general computer system.

Referring to FIG. 9, an illustrative embodiment of a general computer system is shown and is designated 900. The computer system 900 includes a set of instructions that can be executed to cause the computer system 900 to perform any one or more of the methods or computer based functions disclosed herein. The computer system 900 may operate as a standalone device or may be connected, e.g., using a network, to other computer systems or peripheral devices. For example, the computer system 900 may include or be included within any one or more of the media devices 130, 132, 330, or 332, the servers) 108 or 308, or combinations thereof described with reference to FIGS. 1-3.

In a networked deployment, the computer system 900 may operate in the capacity of a server or as a client user computer in a server-client user network environment, or as a peer computer system in a peer-to-peer (or distributed) network environment. The computer system 900 may also be implemented as or incorporated into various devices, such as a mobile device, a palmtop computer, a laptop computer, a desktop computer, a communications device, a wireless telephone, a personal computer (PC), a tablet PC, a personal digital assistant (PDA), an endpoint device, a web appliance, or any other machine capable of executing a set of instructions (sequential or otherwise) that specify actions to be taken by that machine. In a particular embodiment, the computer system 900 may be implemented using electronic devices that provide video, audio, or data communication. Further, while a single computer system 900 is illustrated, the term "system" shall also be taken to include any collection of systems or sub-systems that individually or jointly execute a set, or multiple sets, of instructions to perform one or more computer functions.

As illustrated in FIG. 9, the computer system 900 may include a processor 902, e.g., a central processing unit (CPU), a graphics processing unit (GPU), or both. For example, when the computer system 900 corresponds to a media device, the processor 902 may include or correspond to a processor of the media device 130, 132, 330, or 332 illustrated in FIGS. 1-3. As another example, when the computer system 900 corresponds to a server, the processor 902 may include or correspond to processor(s) of the server(s) 108 or 308 illustrated in FIGS. 1-3. Moreover, the computer system 900 may include a main memory 904 and a static memory 906, which can communicate with each other via a bus 908. For example, when the computer system 900 corresponds to a media device, the main memory 904 may include or correspond to the memory 202 of the media device 130 illustrated in FIG. 2. As another example, when the computer system 900 corresponds to a server, the main memory 904 may include or correspond to a memory of the server(s) 108 or 308 illustrated in FIGS. 1-3. As shown, the computer system 900 may further include a video display unit 910, such as a liquid crystal display (LCD), a light emitting diode (LED) display, a touch screen display, a flat panel display, or a solid state display. Additionally, the computer system 900 may include an input device 912, such as a remote control device or a keyboard, and a cursor control device 914, such as a mouse. In some embodiments, the input device 912 and the cursor control device 914 may be integrated into a single device, such as a capacitive touch screen input device. The computer system 900 may also include a signal generation device 918, such as a speaker, and a network interface device 920. Some computer systems 900 may not include an input device (e.g., a server may not include an input device). To illustrate, when the computer system 900 corresponds to the server(s) 108 or 308 illustrated in FIGS. 1-3, the computer system 900 not include an input device.

In a particular embodiment, as depicted in FIG. 9, the device 900 may include computer-readable storage 922 in which one or more sets of instructions 924, e.g. software, can be embedded. The computer-readable storage 922 may be random access memory (RAM), read-only memory (ROM), programmable read-only memory (PROM), erasable PROM (EPROM), electrically erasable PROM (EEPROM), register(s), solid-state memory, hard disk, a removable disk, a compact disc read-only memory (CD-ROM), other optical disk storage, magnetic disk storage, magnetic storage devices, or any other storage device that can be used to store program code in the form of instructions or data and that can be accessed by a computer and/or a processor. Computer-readable storage is not a signal. Further, the instructions 924 may embody one or more of the methods or logic as described herein.

When the device 900 corresponds to a server, FIG. 9 illustrates that the instructions 924 may include instructions 926 for prediction, node selection (e.g., transmission tower selection), and broadcast/unicast data selection (as described with respect to the instructions 109 and 309 of the respective servers 108 and 308 of FIGS. 1-3). The instructions 924 may be executable by the processor 902 to perform one or more functions or methods described herein, such as the methods 500, 600, 700, or 800 described with reference to FIG. 5, 6, 7, or 8, respectively. In a particular embodiment, the instructions 924 may reside completely, or at least partially, within the main memory 904, the static memory 906, and/or within the processor 902 during execution by the computer system 900. The main memory 904 and the processor 902 also may include a computer-readable storage device.

FIG. 9 illustrates a particular embodiment in which the computer system 900 may correspond to a server, and the computer-readable storage 922 may include data 928. For example, the data 928 may include node data 930 (e.g., transmission tower data), network traffic data 932, content request profiles 934, and multimedia content data 936. To illustrate, the node data 930 may correspond to the node data 126 or 326, the network traffic data 932 may correspond to the network traffic data 120 or 320, the content request profiles may correspond to the content request profiles 124 or 324, and the multimedia content data 936 may correspond to the multimedia content data 138 or 338, as described with respect to FIGS. 1-3.

In an alternative embodiment, dedicated hardware implementations, such as application specific integrated circuits, programmable logic arrays and other hardware devices, may be constructed to implement one or more of the methods described herein. Various embodiments may include a variety of electronic and computer systems. One or more embodiments described herein may implement functions using two or more specific interconnected hardware modules or devices with related control and data signals that can be communicated between and through the modules, or as portions of an application-specific integrated circuit (ASIC). Accordingly, the present system encompasses software, firmware, and hardware implementations.

In accordance with various embodiments of the present disclosure, the methods described herein may be implemented by software programs executable by a computer system, a processor, or a device, which may include forms of instructions embodied as a state machine implemented with logic components in an ASIC or a field programmable gate array (FPGA) device. Further, in an exemplary, non-limiting embodiment, implementations may include distributed processing, component/object distributed processing, and parallel processing. Alternatively, virtual computer system processing may be constructed to implement one or more of the methods or functionality as described herein. It is further noted that a computing device, such as a processor, a controller, a state machine or other suitable device for executing instructions to perform operations may perform such operations directly or indirectly by way of one or more intermediate devices directed by the computing device.

The present disclosure includes computer-readable storage 922 that stores instructions 924, so that a device connected to a network 928 may communicate voice, video or data over the network 928. While the computer-readable storage 922 is shown to be a single device, the computer-readable storage 922 may include a single device or multiple devices, such as a centralized or distributed database, and/or associated caches and servers that store one or more sets of instructions. The computer-readable storage 922 is capable of storing a set of instructions for execution by a processor to cause a computer system to perform any one or more of the methods or operations disclosed herein. For example, the computer-readable storage 922 may store instructions for execution by a processor to cause a computer system to perform any one or more of the methods 500, 600, 700, or 800 described with reference to FIG. 5, 6, 7, or 8, respectively.

In a particular non-limiting, exemplary embodiment, the computer-readable storage 922 may include a solid-state memory such as embedded memory (or a memory card or other package that houses one or more non-volatile read-only memories). Further, the computer-readable storage 922 may be a random access memory or other volatile rewritable memory. Additionally, the computer-readable storage 922 may include a magneto-optical or optical device, such as a disk or tapes or other storage device. Accordingly, the disclosure is considered to include any one or more of a computer-readable storage device and other equivalents and successor devices, in which data or instructions may be stored.

Although the one or more components and functions may be described herein as being implemented with reference to particular standards or protocols, the disclosure is not limited to such standards and protocols. Such standards are from time-to-time superseded by faster or more efficient equivalents having essentially the same functions. Wireless standards for device detection, short-range communications, and long-range communications can be used by the computer system 900 in selected embodiments.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Figures are also merely representational and may not be drawn to scale. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order unless expressly stated. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be implemented as multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines (e.g., virtual servers), components such as microprocessors and storage devices may be virtualized or logically represented. The processor can include a state machine, an application specific integrated circuit, and/or a programmable gate array (PGA) including a FPGA. In one or more embodiments, when a processor executes instructions to perform "operations", this can include the processor performing the operations directly and/or facilitating, directing, or cooperating with another device or component to perform the operations.

The Abstract is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
   determining, at a server associated with a wireless communications network, a first set of multimedia content items to be transmitted via a multimedia broadcast multicast services broadcast transmission to multiple devices including a first device and a second device, wherein the first set of multimedia content items is determined based on a data traffic profile of the wireless communication network;
   selecting, at the server, a particular node of a plurality of nodes of the wireless communications network to transmit the first set of multimedia content items via the multimedia broadcast multicast services broadcast transmission, wherein the particular node includes or is associated with a particular transmission node of a plurality of transmission nodes of the wireless communications network;
   determining, at the server, that the second device is outside of a first transmission range associated with a first transmission power of the particular transmission node;
   determining, at the server, that the second device is within a second transmission range associated with a second transmission power of the particular transmission node;
   sending a message from the server to the particular transmission node, wherein the message includes instructions to transmit the first set of multimedia content items via the multimedia broadcast multicast services broadcast transmission at the second transmission power; and
   determining, at the server, a second set of multimedia content items to be transmitted from the particular node to the first device via a unicast transmission, wherein the second set of multimedia content items is determined based on a content request profile associated with the first device.

2. The method of claim 1, wherein the data traffic profile identifies a plurality of multimedia content items transmitted to multiple devices via the wireless communications network during a first time period associated with a higher network bandwidth consumption rate than a network bandwidth consumption rate associated with a second time period.

3. The method of claim 2, wherein the first set of multimedia content items is predicted to consume more network bandwidth than other multimedia content items of the plurality of multimedia content items during the first time period.

4. The method of claim 2, wherein the first time period represents a peak usage period of the wireless communications network, and wherein the second time period represents an off-peak usage period of the wireless communications network.

5. The method of claim 2, further comprising sending the first set of multimedia content items from the server to the particular node, wherein the particular node transmits the first set of multimedia content items via the multimedia broadcast multicast services broadcast transmission during the second time period.

6. The method of claim 1, wherein:
   the data traffic profile of the wireless communications network identifies a plurality of off-peak usage periods associated with individual nodes of the plurality of nodes of the wireless communications network;
   the server selects the particular node to transmit the first set of multimedia content items via the multimedia broadcast multicast services broadcast transmission based on a comparison of an off-peak usage period associated with the particular node to other off-peak usage periods of the plurality of nodes; and
   the particular transmission node transmits the first set of multimedia content items via the multimedia broadcast multicast services broadcast transmission during the off-peak usage period associated with the particular node.

7. The method of claim 1, wherein the first set of multimedia content items includes a first video-on-demand content item.

8. The method of claim 7, wherein the second set of multimedia content items includes a second video-on-demand content item.

9. The method of claim 1, wherein the content request profile of the first device identifies a plurality of multimedia content items transmitted to the first device via the wireless communications network during a first time period associated with a higher network bandwidth consumption rate than a network bandwidth consumption rate associated with a second time period.

10. The method of claim 9, wherein the second set of multimedia content items is predicted to consume more network bandwidth than other multimedia content items of the plurality of multimedia content items during the first time period.

11. The method of claim 9, further comprising sending the second set of multimedia content items from the server to the particular node, wherein the particular node transmits the second set of multimedia content items to the first device via the unicast transmission during the second time period.

12. The method of claim 1, wherein the particular transmission node includes or is associated with a particular transmission tower of a plurality of transmission towers of the wireless communication network.

13. The method of claim 1, wherein the particular node includes or is associated with an access point, a station, a node B device, or a combination thereof.

14. The method of claim 1, wherein the wireless communications network includes a long term evolution network, and wherein the multimedia broadcast multicast services broadcast transmission includes an evolved multimedia broadcast multicast services broadcast transmission.

15. A computer-readable storage device comprising instructions executable by a processor of a device to perform operations including:
- determining, based on a data traffic profile of a wireless communications network, a first set of multimedia content items to be transmitted via a first multimedia broadcast multicast services broadcast transmission to multiple devices including a first device and a second device;
- selecting a particular node of a plurality of nodes of the wireless communications network to transmit the first set of multimedia content items via the multimedia broadcast multicast services broadcast transmission, wherein the particular node includes or is associated with a particular transmission node of a plurality of transmission nodes of the wireless communications network;
- determining that the second device is outside of a first transmission range associated with a first transmission power of the particular transmission node;
- determining that the second device is within a second transmission range associated with a second transmission power of the particular transmission node;
- sending a message to the particular transmission node, wherein the message includes instructions to transmit the first set of multimedia content items via the multimedia broadcast multicast services broadcast transmission at the second transmission power; and
- determining, based on a content request profile associated with the first device, a second set of multimedia content items to be transmitted to the first device via a unicast transmission.

16. The computer-readable storage device of claim 15, the operations further comprising:
- determining, based on the data traffic profile of the wireless communications network, a third set of multimedia content items to be transmitted via a second multimedia broadcast multicast services broadcast transmission,
- wherein the third set of multimedia content items is transmitted via the second multimedia broadcast multicast services broadcast transmission before the second set of multimedia content items is transmitted to the first device via the unicast transmission.

17. The computer-readable storage device of claim 15, the operations further comprising:
- sending the first set of multimedia content items to the particular node;
- receiving a second message from the particular node, wherein the second message indicates that the first set of multimedia content items has been transmitted by the particular node via the first multimedia broadcast multicast services broadcast transmission; and
- in response to receiving the second message, sending instructions to the particular node to transmit the second set of multimedia content items to the first device via the unicast transmission.

18. An electronic device comprising:
- a processor;
- a memory in communication with the processor, the memory including instructions executable by the processor to perform operations including:
  - determining, based on a data traffic profile of a wireless communications network, a first set of multimedia content items to be transmitted via a first multimedia broadcast multicast services broadcast transmission to multiple devices including a first device and a second device;
  - selecting a particular node of a plurality of nodes of the wireless communications network to transmit the first set of multimedia content items via the multimedia broadcast multicast services broadcast transmission, wherein the particular node includes or is associated with a particular transmission node of a plurality of transmission nodes of the wireless communications network;
  - determining that the second device is outside of a first transmission range associated with a first transmission power of the particular transmission node;
  - determining that the second device is within a second transmission range associated with a second transmission power of the particular transmission node;
  - sending a message to the particular transmission node, wherein the message includes instructions to transmit the first set of multimedia content items via the multimedia broadcast multicast services broadcast transmission at the second transmission power; and
  - determining, based on a content request profile associated with the first device, a second set of multimedia content items to be transmitted to the first device via a unicast transmission.

19. The electronic device of claim 18, wherein the content request profile identifies a plurality of multimedia content items that are transmitted to the device during a peak usage period of the wireless communications network.

20. The electronic device of claim 19, the operations further comprising:
- sending a second message to the particular transmission node, wherein the second message identifies an off-peak usage period associated with the multimedia broadcast multicast services broadcast transmission; and
- transmitting, during at least a portion of the off-peak usage period, the first set of multimedia content items.

* * * * *